United States Patent [19]
Lee et al.

[11] Patent Number: 5,815,669
[45] Date of Patent: Sep. 29, 1998

[54] METHOD OF ROUTING A DATA TRANSMISSION

[75] Inventors: Warren S. Lee; David W. Copp, both of Jacksonville, Fla.; Dale T. Platteter, Pittsford, N.Y.; Neil P. Carrier, Jacksonville, Fla.

[73] Assignee: NKO, Inc., Jacksonville, Fla.

[21] Appl. No.: 649,208

[22] Filed: May 17, 1996

[51] Int. Cl.$^6$ ................................................. G06F 17/00
[52] U.S. Cl. ..................................................... 395/200.68
[58] Field of Search ......................... 395/200.36, 200.79, 395/200.68; 358/440, 402, 468

[56] References Cited

U.S. PATENT DOCUMENTS

| | | | |
|---|---|---|---|
| 4,058,838 | 11/1977 | Crager et al. | 358/257 |
| 4,741,021 | 4/1988 | Kotani et al. | 379/100 |
| 4,746,986 | 5/1988 | Tanigawa | 358/256 |
| 4,961,185 | 10/1990 | Sawada | 370/79 |
| 4,964,154 | 10/1990 | Shimotono | 379/100 |
| 4,964,159 | 10/1990 | Son | 379/356 |
| 4,974,097 | 11/1990 | Kaneko et al. | 358/400 |
| 4,999,836 | 3/1991 | Fujiwara | 370/110.1 |
| 5,033,078 | 7/1991 | Andoh | 379/100 |
| 5,034,948 | 7/1991 | Mizutani et al. | 370/79 |
| 5,050,005 | 9/1991 | Kagami | 358/434 |
| 5,065,254 | 11/1991 | Hishida | 358/440 |
| 5,065,427 | 11/1991 | Godbole | 379/100 |
| 5,113,396 | 5/1992 | Kagami | 370/110.2 |
| 5,134,611 | 7/1992 | Steinka et al. | 370/79 |
| 5,134,653 | 7/1992 | Satomi et al. | 379/355 |
| 5,142,568 | 8/1992 | Ogata et al. | 379/100 |
| 5,170,428 | 12/1992 | Watanabe et al. | 379/94 |
| 5,187,591 | 2/1993 | Guy et al. | 358/425 |
| 5,189,525 | 2/1993 | Kotani | 358/407 |
| 5,189,696 | 2/1993 | Yoshida | 379/355 |
| 5,204,895 | 4/1993 | Yoshiura | 379/100 |
| 5,216,517 | 6/1993 | Kinoshita et al. | 358/400 |
| 5,216,519 | 6/1993 | Daggett et al. | 358/434 |
| 5,216,705 | 6/1993 | Yoshida et al. | 379/100 |
| 5,228,128 | 7/1993 | Kim | 395/275 |
| 5,235,595 | 8/1993 | O'Dowd | 370/94.1 |
| 5,241,589 | 8/1993 | Jefferson | 379/355 |
| 5,260,991 | 11/1993 | Ikegaya | 379/100 |
| 5,267,307 | 11/1993 | Izumi et al. | 379/354 |
| 5,272,749 | 12/1993 | Masek | 379/216 |
| 5,278,665 | 1/1994 | Sawada et al. | 358/442 |
| 5,280,516 | 1/1994 | Jang | 379/57 |

(List continued on next page.)

FOREIGN PATENT DOCUMENTS 092012591  7/1992  WIPO ................................... 358/440

OTHER PUBLICATIONS

CCITT X.5: Data Communication Networks: Services and Facilities, Interfaces—Facsimile Packet Assembly/Disassembly Facility (FPAD) in a Public Data Newtork, Geneva, 1992.

CCITT X.39: Data Communication Networks: Services and Facilities, Interfaces—Procedures for the Exchange of Control Information and User Data Between a Facsimile Packet Assembly/Disassembly (FPAD) Facility and a packet Mode Data Terminal Equipment (DTE) or Another FPAD, Geneva 1992.

ITU–T X.29: Public Data Networks: Interfaces—Procedures for the Exchange of Control Information and User Data Between a Packet Assembly/Diassembly (PAD) Facility and a Packet Mode DTE or Another Pad, Mar. 1993.

*Primary Examiner*—Ellis B. Ramirez
*Attorney, Agent, or Firm*—Foley & Lardner

[57] ABSTRACT

A method of routing a data transmission includes the first step of receiving a destination number of a data transmission. The destination number corresponds to a first communication network, e.g. voice grade analog telephone lines. In the second method step, a determination is made as to whether the data transmission should be routed through a second communication network, e.g. a digital network. In the third method step, the data transmission is routed through the second communication network if the second step so determines.

20 Claims, 13 Drawing Sheets

U.S. PATENT DOCUMENTS

| | | | |
|---|---|---|---|
| 5,282,202 | 1/1994 | Bernstein et al. | 370/94.1 |
| 5,282,238 | 1/1994 | Berland | 379/58 |
| 5,287,199 | 2/1994 | Zoccolillo | 358/440 |
| 5,287,202 | 2/1994 | Kumarappan | 358/440 |
| 5,289,533 | 2/1994 | Wasio et al. | 379/100 |
| 5,289,536 | 2/1994 | Hokari | 379/221 |
| 5,291,302 | 3/1994 | Gordon et al. | 358/400 |
| 5,295,244 | 3/1994 | Dev et al. | 395/161 |
| 5,299,257 | 3/1994 | Fuller et al. | 379/100 |
| 5,305,372 | 4/1994 | Tomiyori | 379/59 |
| 5,315,649 | 5/1994 | Foster et al. | 379/355 |
| 5,323,398 | 6/1994 | Wake et al. | 370/110 |
| 5,329,580 | 7/1994 | Yoshino | 379/90 |
| 5,337,349 | 8/1994 | Furohashi et al. | 379/100 |
| 5,339,174 | 8/1994 | Harris | 358/442 |
| 5,347,516 | 9/1994 | Yoshida | 370/94.1 |
| 5,381,240 | 1/1995 | Murayama | 358/436 |
| 5,410,416 | 4/1995 | Amberg et al. | 358/405 |
| 5,426,692 | 6/1995 | Fujise | 379/93 |
| 5,444,707 | 8/1995 | Cerna et al. | 370/94.1 |
| 5,490,199 | 2/1996 | Fuller et al. | 379/1 |
| 5,509,050 | 4/1996 | Berland | 358/440 |
| 5,513,126 | 4/1996 | Harkins et al. | 358/402 |
| 5,581,366 | 12/1996 | Merchant et al. | 358/402 |
| 5,604,795 | 2/1997 | Saito | 358/440 |

METHOD OF ROUTING A DATA TRANSMISSION

RELATED APPLICATIONS

This application is related to applications entitled "METHOD OF MONITORING A DATA TRANSMISSION," serial number (unassigned), attorney docket number 75488/110; "FACSIMILE JACK FOR SELECTIVELY ROUTING A TRANSMISSION THROUGH A FACSIMILE NETWORK," serial number (unassigned), attorney docket number 75488/104; "APPARATUS AND METHOD FOR TRANSMITTING FACSIMILE DATA," serial number (unassigned), attorney docket number 75488/105; "POINT OF PRESENCE (POP) FOR DIGITAL FACSIMILE NETWORK," serial number (unassigned), attorney docket number 75488/102; "POINT OF PRESENCE (POP) FOR DIGITAL FACSIMILE NETWORK WITH VIRTUAL POPS USED TO COMMUNICATE WITH OTHER NETWORKS," serial number (unassigned), attorney docket number 75488/109; and "POINT OF PRESENCE (POP) FOR DIGITAL FACSIMILE NETWORK WITH SPOOFING CAPABILITY TO MAINTAIN FAX SESSION," serial number (unassigned), attorney docket number 75488/108; all of which are filed concurrently with this application and all of which are incorporated by reference herein.

BACKGROUND OF THE INVENTION

1. Field of the Invention

The invention is related to routing data transmissions, and more particularly, the invention is related to a method of routing a data transmission, including facsimile, voice, and modem data, by choosing a preferred communication network. One embodiment of the invention is directed to routing a facsimile transmission through a digital facsimile network.

2. Description of the Related Art

Conventionally, facsimile data transmissions are conducted entirely through voice grade, analog telephone lines. A typical facsimile transmission route is shown in FIG. 1. A source facsimile device 10 dials a phone number of a destination facsimile device 12. The call is routed through a telephone jack 20 to a local exchange carrier at a central office (LEC CO) 30. Subsequently, a connection is made from the LEC CO 30 to a local inter-exchange carrier's point of presence (IXC POP) 40. The local IXC POP 40 makes a connection through a long distance carrier facility 50 to a destination IXC POP 42 which in turn makes a connection to a destination LEC CO 32. The destination LEC CO 32 then calls the phone number of the destination facsimile device 12. Once the destination facsimile device 12 answers, an end-to-end connection is established between the two facsimile devices 10, 12. The appropriate facsimile session setup is then performed by the two facsimile devices 10, 12, and this is followed by the facsimile data transmissions. Upon completion of the facsimile data transmissions, the facsimile devices hang up and the connection is terminated.

In the conventional system illustrated in FIG. 1, when one facsimile device dials another, a circuit-like connection is created between the two devices. Data is transmitted between the devices in real-time. In other words, there is little delay from when the source facsimile device 10 sends data to when the destination facsimile device 12 receives the data.

Further in the conventional system, tele-communications services (phone lines, etc.) used for facsimile transmissions, and their associated cost structure, are formally defined by the carrier in a document called a tariff. Tariffs are filed for approval by state regulatory commissions and/or the Federal Communication Commission (FCC).

There are also store and forward services available for transmitted facsimiles. With store and forward, a facsimile is generally transmitted to a local vendor with information about the final destination. The local vendor then takes responsibility for delivering the facsimile. Such services are not real-time in that there is no circuit-like connection between the source and destination facsimile devices. In such systems, the facsimile transmission is usually sent at a later time when the rates are less. A disadvantage of such systems is that in the event a facsimile cannot be delivered to the destination facsimile device, there may be no reliable way of notifying the user of the source facsimile device that the facsimile has not been delivered. Important facsimile transmissions requiring immediate delivery and confirmation of receipt generally cannot be sent through such systems.

Another conventional way of reducing costs of data transmission including, for example, facsimile data, voice data, and modem data, is to use alternate communication services, such as a dedicated telephone lines such as a Wide Area Telephone Service (WATS) line. Alternatively, telephone companies offer a variety of overlapping discount schedules which could be utilized to minimize costs for a particular transmission. A disadvantage of using such alternate communication services is that a user has to be aware of a multitude of telephone number, access codes, and rate schedules.

As described above, facsimile transmissions today are accomplished through the use of analog grade circuits. The bandwidth of analog voice grade circuits is however very small and so telephone companies have migrated their equipment to provide their transmission services using a digital network. Nevertheless, access to the digital network is still made through voice grade lines and thus facsimile transmissions still need to be converted from analog to digital. The conversion from analog to digital involves a fairly high data rate, 64 Kilo-bits per second (Kbps), but the overall transmission speed is limited by the rate of transmission over the voice grade line, 9.6 Kbps or 14.4 Kbps. As a consequence, when a facsimile is sent over a voice grade circuit through the network's digital transmission facilities, most of the bandwidth is not utilized even though it is being paid for.

An example of the above-described digital network is shown in FIG. 2, and corresponds to a system recommended in a document published by The International Telegraph and Telephone Consultative Committee (CCITT). In the CCITT system, data is transmitted digitally between a source facsimile packet assembly/disassembly facility (FPAD) 44 and a destination FPAD 46 through a Packet Switched Public Data Network (PSPDN) 51. The access to either FPAD 44 or 46 is still made through its respective General Switched Telephone Network (GSTN) 31 or 33. The CCITT system has some technical characteristics, however, which make it unattractive, particularly for facsimile transmissions. They are:

1. It runs on X.25 protocol which significantly increases the length of call.
2. It does not guarantee delivery of data.
3. It has a variable delay in delivery of communicated packets.
4. It does not accommodate switched analog access lines.

SUMMARY OF THE INVENTION

An object of the invention is to provide a method for transparently routing a data transmission over a preferred communication network.

An object of the invention is to provide a method for routing facsimile transmissions over a digital facsimile network.

Another object of the invention is to minimize the amount of time required to connect a facsimile device to a digital facsimile network.

Another object of the invention is to provide a method of monitoring a facsimile transmission.

These and other objects of the invention are accomplished by a method of routing a data transmission which includes the first step of receiving a destination number of a data transmission. The destination number corresponds to a first communication network, e.g. voice grade analog telephone lines. In the second method step, a determination is made as to whether the data transmission should be routed through a second communication network, e.g. a digital network for a facsimile data transmission or a WATS line for a voice data transmission. In the third method step, the data transmission is routed through the second communication network if the second step so determines.

The first step may include isolating a data transmission device, e.g. a facsimile device or a telephone, from the first communication network and intercepting the destination number of the data transmission when the device attempts to connect to the first communication network. The determination in the second step may be made in accordance with locally held information. The locally held information may include communication network exchange information, such as area codes and local exchange numbers. The locally held information may include selective access information, such as a time of day to access the second communication network or a frequency of transmissions to route through the second communication network (e.g., only 1 out of 3 transmissions).

In an alternative embodiment, the method according to the invention includes the steps of detecting an off-hook signal from a data transmission device, pre-dialing two or more digits of a telephone number corresponding to a predetermined communication network, determining whether a connection to the predetermined communication network should be established, and dialing the remaining digits of the telephone number of the predetermined communication network if the connection should be established.

Additional objects and advantages of the invention will be set forth in the description which follows. The objects and advantages of the invention may be realized and obtained by means of instrumentalities and combinations particularly pointed out in the appended claims.

BRIEF DESCRIPTION OF THE DRAWINGS

The invention is described in detail herein with reference to the drawings in which.

DETAILED DESCRIPTION OF THE PREFERRED EMBODIMENTS

Figure 1:
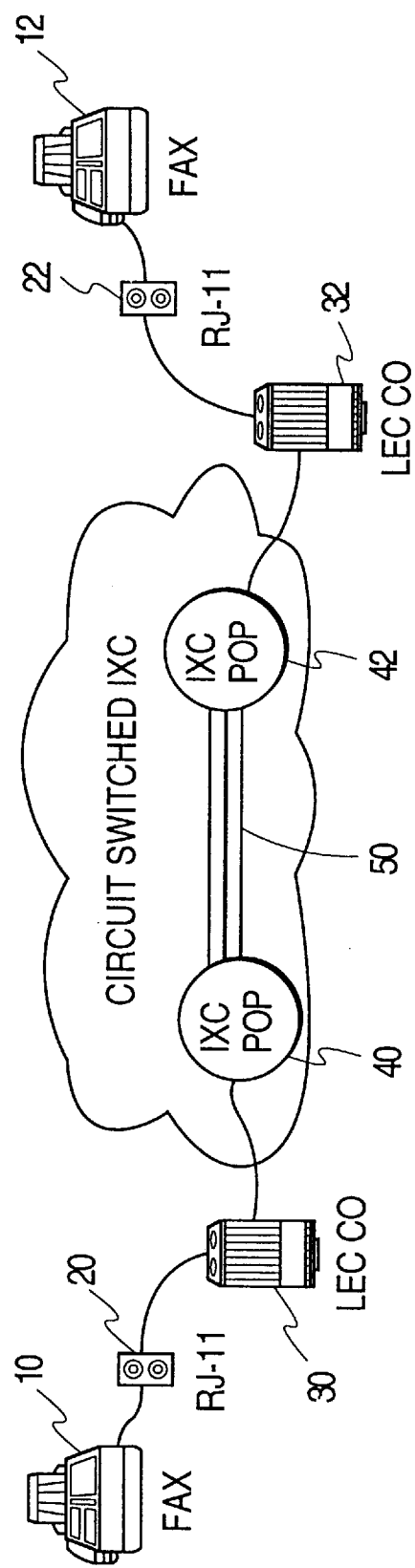
FIG. 1 is a schematic illustration of a conventional facsimile transmission system.
Figure 2:
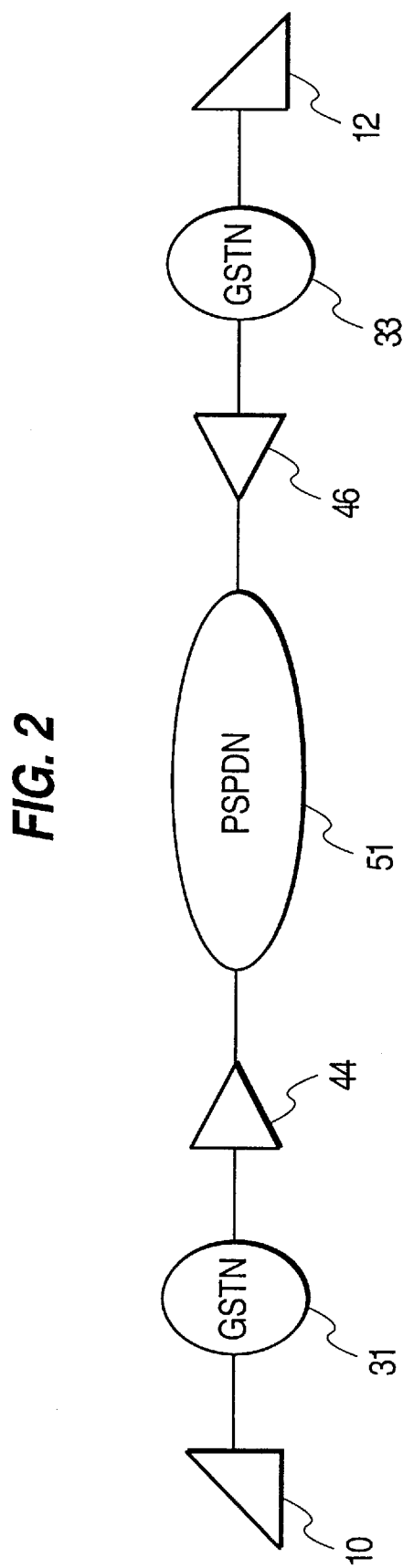
FIG. 2 is a schematic illustration of a digital facsimile transmission system.
Figure 3:
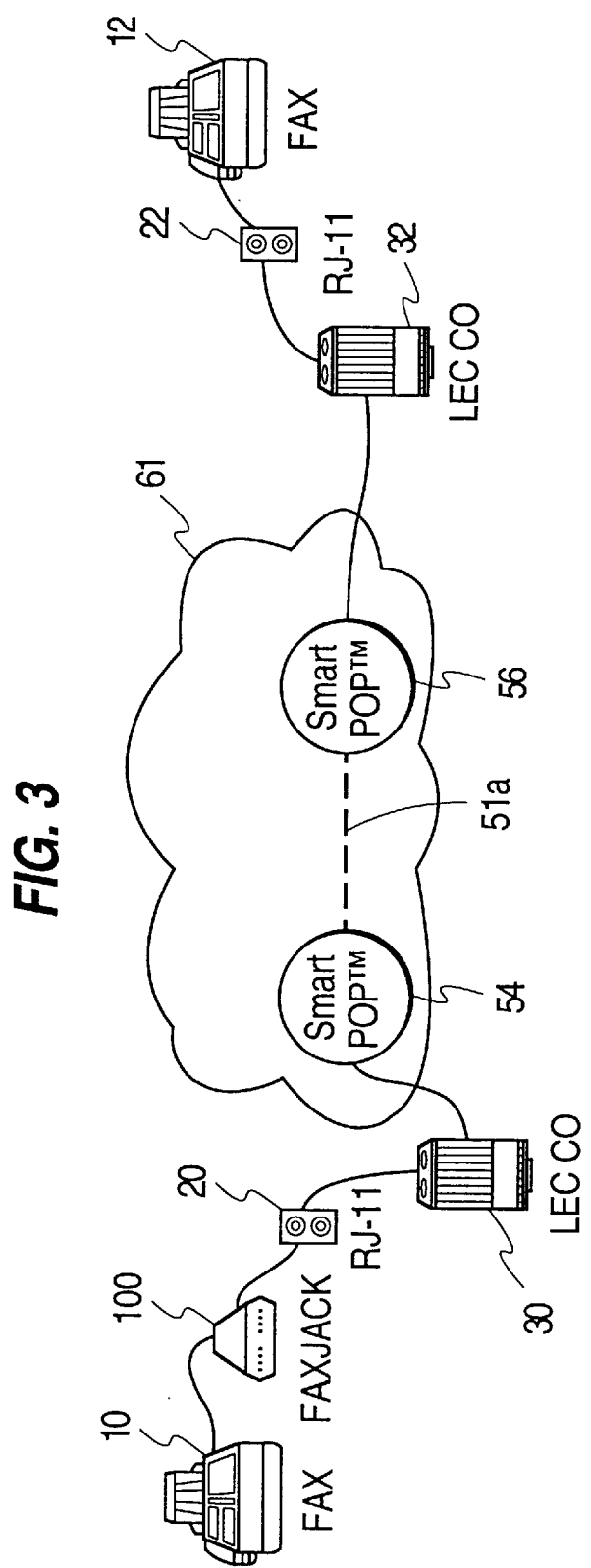
FIG. 3 is a schematic diagram of a digital facsimile transmission system which utilizes the routing method according to the invention.

FIG. 3 is a schematic illustration of a digital facsimile transmission system which utilizes the routing method according to the invention. In the system according to the invention, instead of the data being transmitted through voice grade lines, it is communicated using packet switched digital lines 51a. The data is transmitted digitally between a source SmartPOP™ 54 and a destination SmartPOP™ 56. This is accomplished by selectively redirecting the user's long distance calls before they are directed to their long distance carrier. To allow such selective redirection, a facsimile jack 100 according to the invention is provided between the facsimile device 10 and the telephone jack 20.

Analog lines are still used to communicate from the source facsimile device 10 to the source SmartPOP™ 54 and from the destination SmartPOP™ 56 and the destination facsimile device 12. The reason for using digital communications between the two SmartPOP™'s is that the cost of transmitting digital data is significantly less than analog data.

In FIG. 3, the connection between the two SmartPOP™'s indicated as 51a is may be a copper wire link, a fiber optic link, a satellite link, or a microwave link. In other words, the connection 51a represents a virtual connection from one SmartPOP™ to another.

Details of the frame relay network and the SmartPOP™ used in the network are respectively provided in the related applications entitled, "APPARATUS AND METHOD FOR TRANSMITTING FACSIMILE DATA" and "POINT OF PRESENCE (POP) FOR DIGITAL FACSIMILE NETWORK."

In the conventional system, a user's long distance facsimile transmissions are automatically routed to their chosen IXC POP at the LEC CO. Providing user access to a packet switched SmartPOP™ requires selectively redirecting their long distance calls before they are directed to their long distance carrier. To allow such selective redirection, a facsimile jack 100 according to the invention is provided between the source facsimile device 10 and the telephone jack 20 (see FIGS. 3 and 4).

The facsimile jack 100 re-routes calls from the source facsimile's normal long distance carrier through the packet switched digital facsimile network of FIG. 3. A principal purpose of the facsimile jack 100 is to transparently redirect calls made by the attached facsimile device and transmit them over the digital facsimile network. In other words, from the users' standpoint, facsimile transmissions are sent and received the same way after the facsimile jack 100 is installed as it was before it was installed. The facsimile jack 100 decides on a call by call basis whether a call should be directed through the digital facsimile network. In order to do this, for example, the facsimile jack 100 can store the area codes and corresponding exchanges of those areas serviced by the network in a non-volatile memory (NVM). The facsimile jack 100 may also provide additional functionality which is transparent to the user such as collecting data on all incoming and outgoing facsimile sessions.

Additionally, the data and the software in the facsimile jack 100 can be updated remotely. This allows for software updates and additional features to be added over time. It also allows for downloading of network directories and uploading of statistical information to the network.

Figure 4:
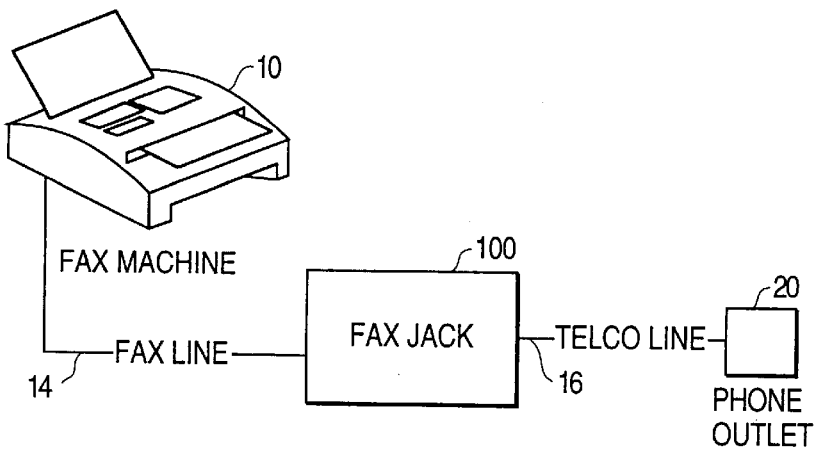
FIG. 4 is a block diagram showing a device which implements the method according to the invention connected between a facsimile device and a telephone wall outlet.

Referring to FIG. 4 and throughout the specification, a connection 14 between the source facsimile device 10 and the facsimile jack 100 is referred to as a "facsimile line" and a connection 16 between the facsimile jack 100 and the telephone jack 20 is referred to as a "telephone line." Also the term "fax" is used interchangeably with the term "facsimile."

The redirection of a facsimile transmissions is performed by the facsimile jack 100 in the following manner. A user at the source facsimile device 10 places documents to be transmitted into the source facsimile device 10 and keys in the phone number of the destination facsimile device 12. The source facsimile device 10 then issues an off-hook signal to gain control of the telephone line. The facsimile jack 100 detects the request for the off-hook and takes the telephone line off-hook and connects a receive channel of the telephone line with a receive channel of the facsimile line. The source facsimile device 10, detects the dial tone and initiates dialing. Instead of the digits being dialed by the facsimile device being transmitted directly to the LEC CO 30, they are intercepted by the facsimile jack 100. The facsimile jack 100 then determines if the number being dialed is service by the network. If it is not, the facsimile jack dials the original number to the transmit portion of the telephone line and connects the transmit portion of the facsimile line to the telephone line. If the number is serviced by the network, the facsimile jack 100 dials the local number of the SmartPOP™ 54.

Once connected to the SmartPOP™ 54, the facsimile jack 100 communicates setup information such as serial number of the facsimile jack 100 and the destination phone number. At this point the facsimile jack 100 and the SmartPOP™ 54 are in communication with each other and can communicate additional data if necessary. After the source SmartPOP™ 54 has verified that the facsimile jack 100 is registered, it connects to a destination SmartPOP™ 56 which is servicing the destination facsimile phone number. The number being dialed is passed to the destination SmartPOP™ 56 and the SmartPOP™ 56 attempts to connect with the destination facsimile device 12. After connecting and communicating initial facsimile device setup parameters, the destination SmartPOP™ 56 notifies the source SmartPOP™ 54 that it has made a successful connection with the destination facsimile device 12. At this point, the facsimile jack 100 connects the transmit signal of the facsimile line to the telephone line and the source facsimile device 10 begins to transmit data. The data from the source facsimile device 10 is received as analog signals by the source SmartPOP™ 54 and then digitized and transmitted as packets to the destination SmartPOP™ 56. The digitized packets are received and recombined by the destination SmartPOP™ 56 and converted back to analog signals. These analog signals are then sent to the destination facsimile device 12. Information communicated between the destination facsimile device 12 and the source facsimile device 10 is also carried out in the same manner. It is possible for devices which transmit facsimiles without the use of facsimile devices, e.g., computers, to implement the functional equivalent of the facsimile jack 100 in software.

While the foregoing description relates to the transmission of facsimile data, the advantages provided by the instant invention are applicable to the transmission of other types of data, such as voice and modem data.

For example, if a user has a WATS line which provides less costly communication between its various locations, the user would prefer that the WATS line be used instead of the conventional telephone network for interoffice communication. Using the WATS line, however, requires the user to know multiple alternate telephone numbers and to directly dial the appropriate number.

Alternatively, a user may use multiple telephone carriers with a variety of discount schedules based on, among other things, the destination of the call, the day of the week, and/or the time of day. The various telephone carriers may further require a particular access number to be dialed prior to dialing the destination number.

Figure 5:
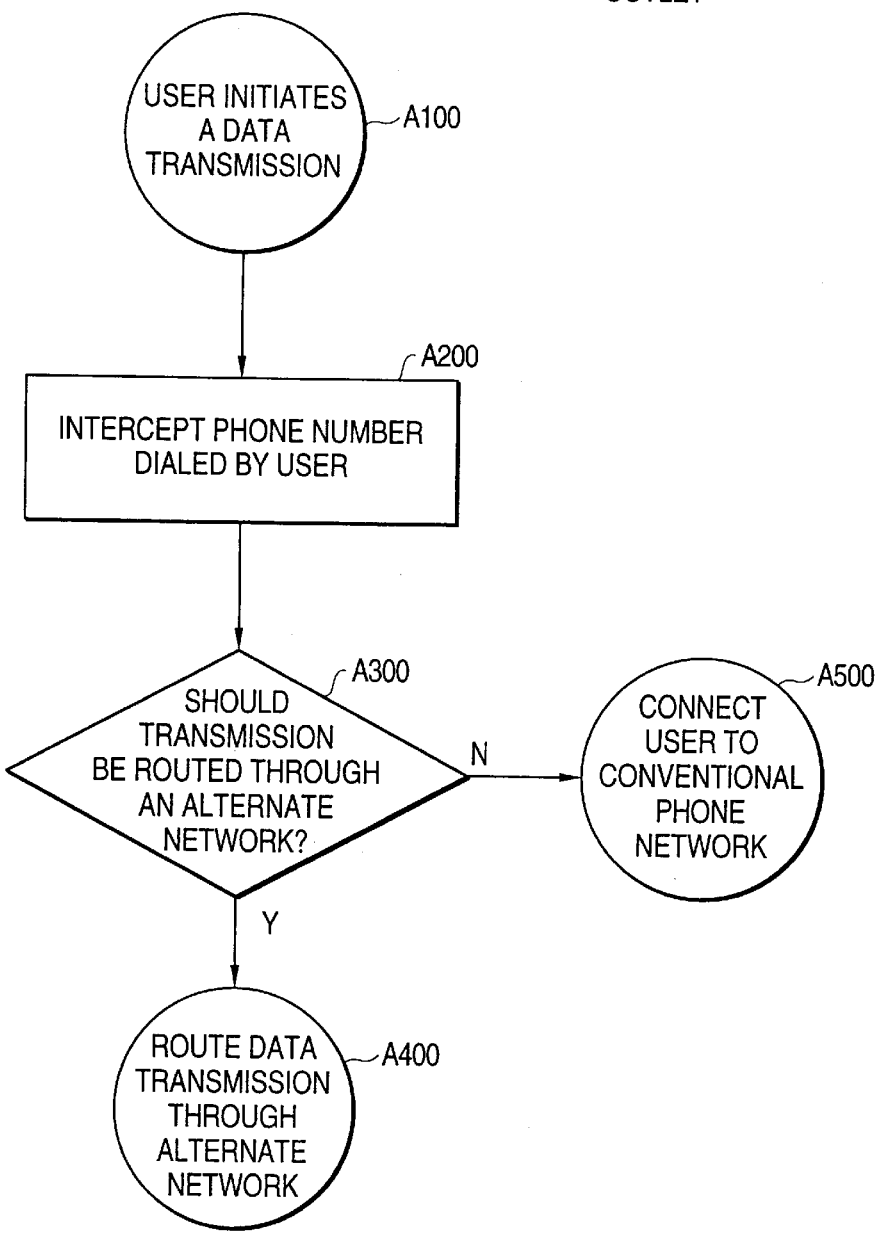
FIG. 5 is a flow diagram of the method of routing a data transmission according to the invention.

FIG. 5 shows a flowchart for a method of routing a facsimile transmission according to the present invention. In step A100, a user initiates a data transmission. Processing step A200 intercepts a phone number, corresponding to the conventional telephone network, dialed by the user. Next, decision step A300 determines whether or not the data transmission should be routed over an alternate communication network. The decision could be based, for example, on the factors discussed above. If decision step A300 determines that the transmission should be routed over the alternate network, step A400 does so. If decision step A300 determines that the transmission should not be routed over the network, step A500 connects the user to the conventional phone network.

The embodiment shown in FIG. 5 has the advantage of providing the user transparent access to a preferred communication network without the user having to be aware of all the previously described criteria which might affect the decision to choose a particular communication network. For example, if a user's cellular communication carrier offers free air time on the weekends, step A300 may decide to route the calls made on Saturday and Sunday through that network. Alternatively, if the user has a WATS line between offices, decision step A300 may decide to route interoffice calls, determined as such based on the destination number, through the user's WATS line. In either of the foregoing examples, the user would simply dial the conventional telephone number without regard to what the preferred communication network might be.

The related application entitled "FACSIMILE JACK FOR SELECTIVELY ROUTING A TRANSMISSION THROUGH A FACSIMILE NETWORK" describes the hardware embodiment of a facsimile jack 100. An embodiment of a software implemented method for routing facsimile transmissions according to the invention suitable for controlling the described hardware is shown as a state diagram in FIG. 6a. Upon power-up, a selftest state B100 is entered. Upon the occurrence of a "passed" event, the software moves to an initialize state B110. If selftest state B100 receives a "failed" event, the software moves to terminate state B600. Upon receipt of a "done" event in the initialize state B110, the software enters a control state B120. The control state B120 is responsive to a number of events including an "off-hook" event, a "ring indicator" event, a "callback" event, and a "background selftest failed" event.

Upon receipt of an "off-hook" event, the software moves to a SmartPOP™ predial state B130 until SmartPOP™ predial state B130 receives a "done" event. The software then moves to a dual tone multiple frequency (DTMF) parse state B140. Upon receipt of a "hangup" event, the software returns from the DTMF parse state B140 to the control state B120. Upon receipt of a "LCM found" event, the software moves to a local control mode state B300 and then, upon receipt of a "done" event, returns to the control state B120. An "LCM not found" event causes the software to move from the DTMF parse state B140 to a dialing processor state B150.

The dialing processor state B150 is responsive to a number of events including a "network call" event, an "alternate service call" event, and a "non-network call" event. A "network call" event moves the software to a network processing state B160, an "alternate service call" event moves the software to an alternate service processing state B170, and a "non-network call" event moves the software to a non-network processing state B180. From each of the foregoing states, B160, B170, and B180, a "call complete" event causes the software to move to an update statistics state B200. The update statistics state B200 receives statistical data for the current fax session and updates a statistical database stored in NVM. Upon receipt of a "done" event, the software returns from the update statistics state B200 to the control state B120.

In response to a "ring indicator" event, the software moves to an incoming call processing state B400. Upon receipt of a "call complete" event, the software moves from the incoming call processing state to the update statistics state B200. As previously described, when the update statistics state B200 receives a "done" event, the software returns to the control state B120.

The software moves from the control state B120 to a callback processing state B500 upon receipt of a "callback" event. The software returns to the control state B120 from the callback processing state B500 upon receipt of a "done" event.

Upon receipt of a "background selftest failed" event, the software moves from the control state B120 to the terminate state B600.

Figure 6A:
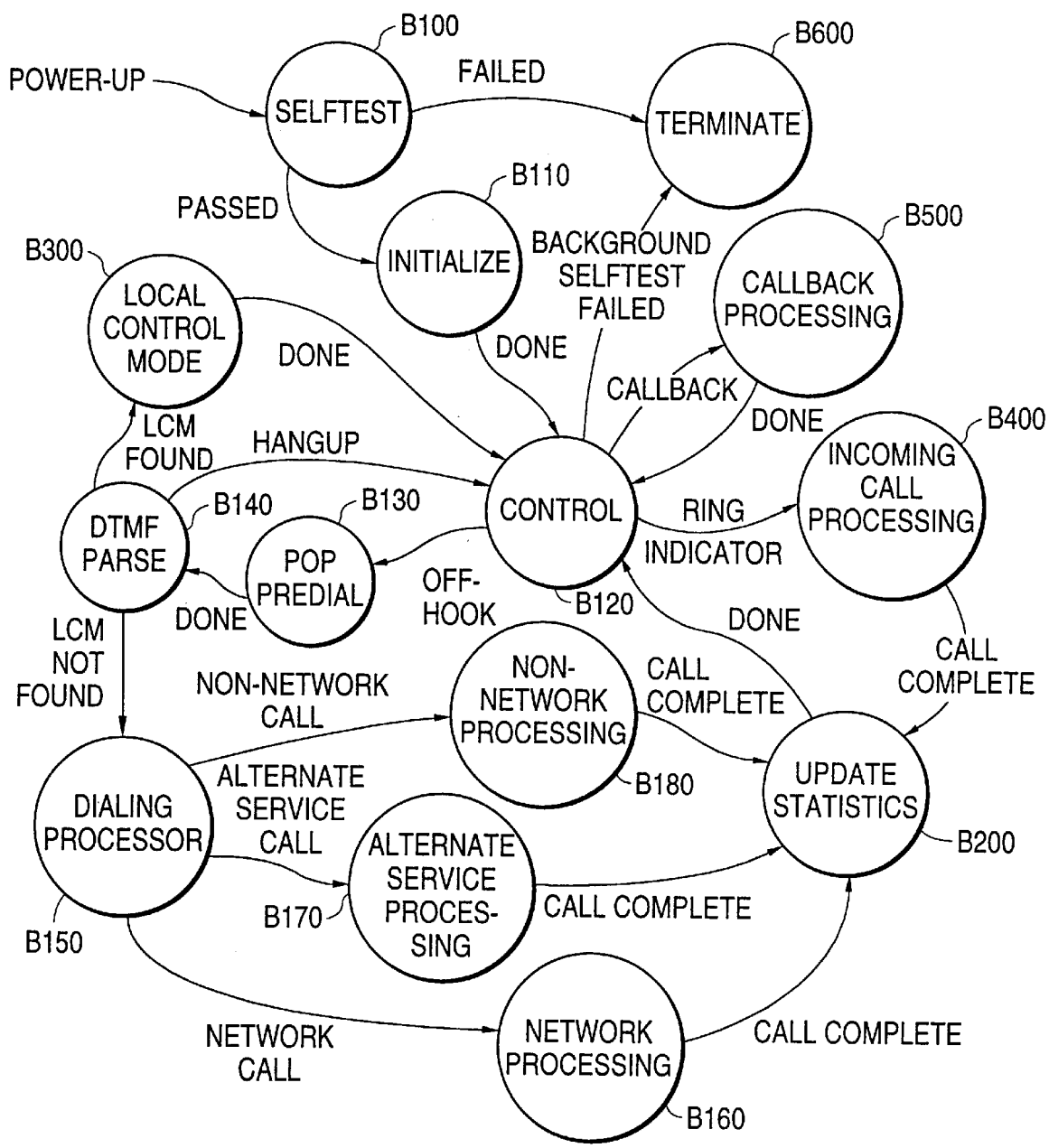
FIG. 6a is a state diagram of the method of routing a facsimile transmission according to the invention.

Processing, as described above in reference to FIG. 6a, would continue until power-down. For simplicity, the state diagram in FIG. 6a does not include timeout or hang-up processing. These events are included in the description of each of the states. Each of the states in FIG. 6a is described in more detail below. Note that each state may be composed of sub-states. Each of the sub-states will be discussed in the appropriate sections.

Figure 6B:
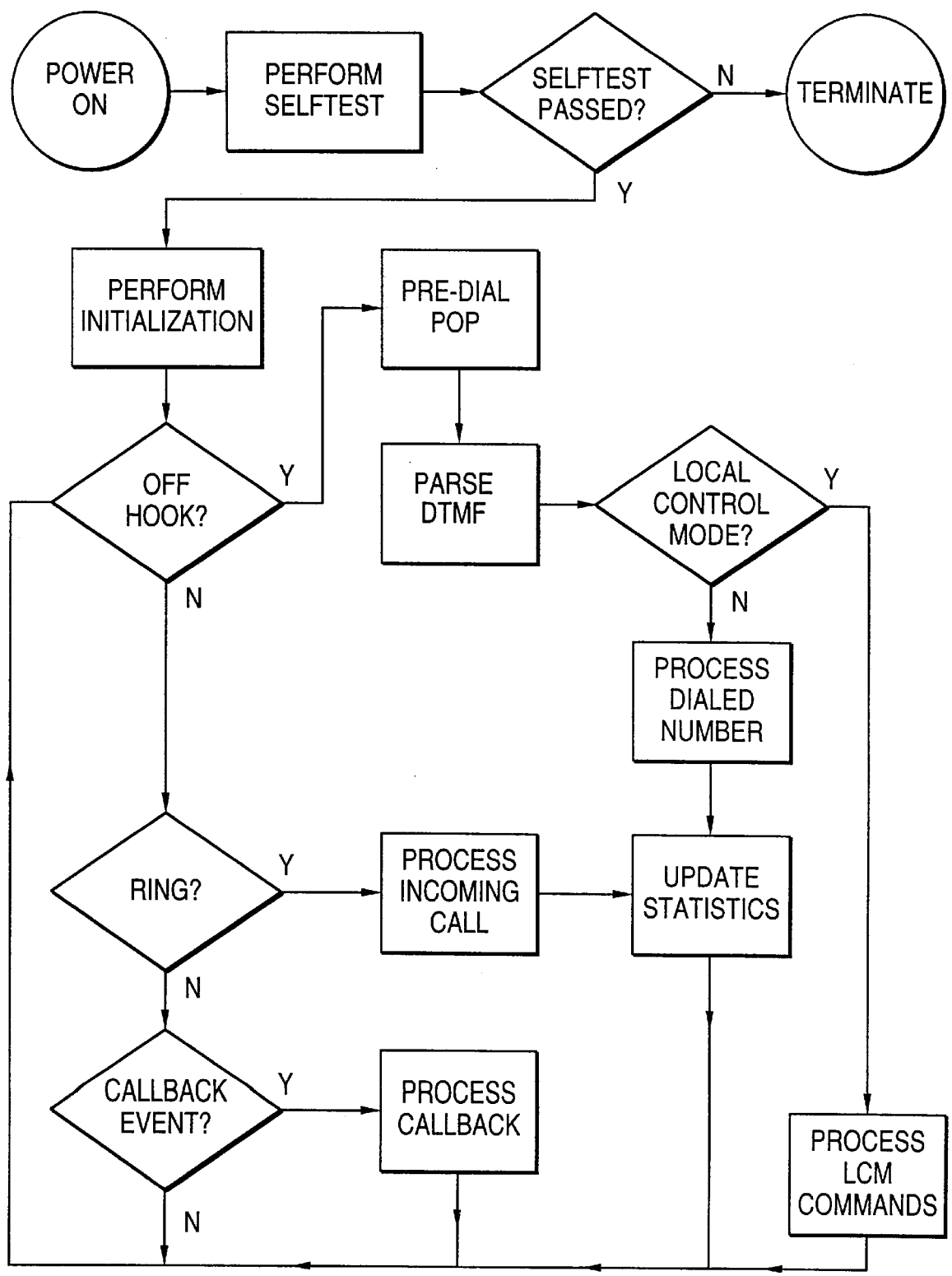
FIG. 6b is a flow diagram of the method of routing a facsimile transmission according to the invention.

FIG. 6b shows a flow chart of a second embodiment of a software implemented method for routing a facsimile transmission according to the invention.

The software implemented method as described above is operable with a microprocessor. An exemplary embodiment includes an Intel 8051 type microprocessor platform. The software can be stored in memory coupled to the microprocessor. For example, the software can be divided into two different code segments. One code segment, referred to as the read-only memory (ROM) code, can contain "boot-up" software, and the other code segment, referred to as the non-volatile memory (NVM) code, can contain the remaining software necessary to carry out other functions.

The "boot-up" software may include functions such as hardware selftest, ROM code checksum, NVM code checksum, RAM initialization, hardware initialization, Local Control Mode (LCM) operation, and a base set of the facsimile jack communications. The facsimile jack base set of communications may provide for communications with the Network Operations Center (NOC), to allow the facsimile jack to download NVM code and database information required for initialization and operation. The base set of communications may further provide for registration and validation of the facsimile jack. The NVM code may be stored in Non-Volatile Memory, NVM, such as FLASH, $E^2$PROM or SRAM and can be updatable through the modem interface.

Figure 7:
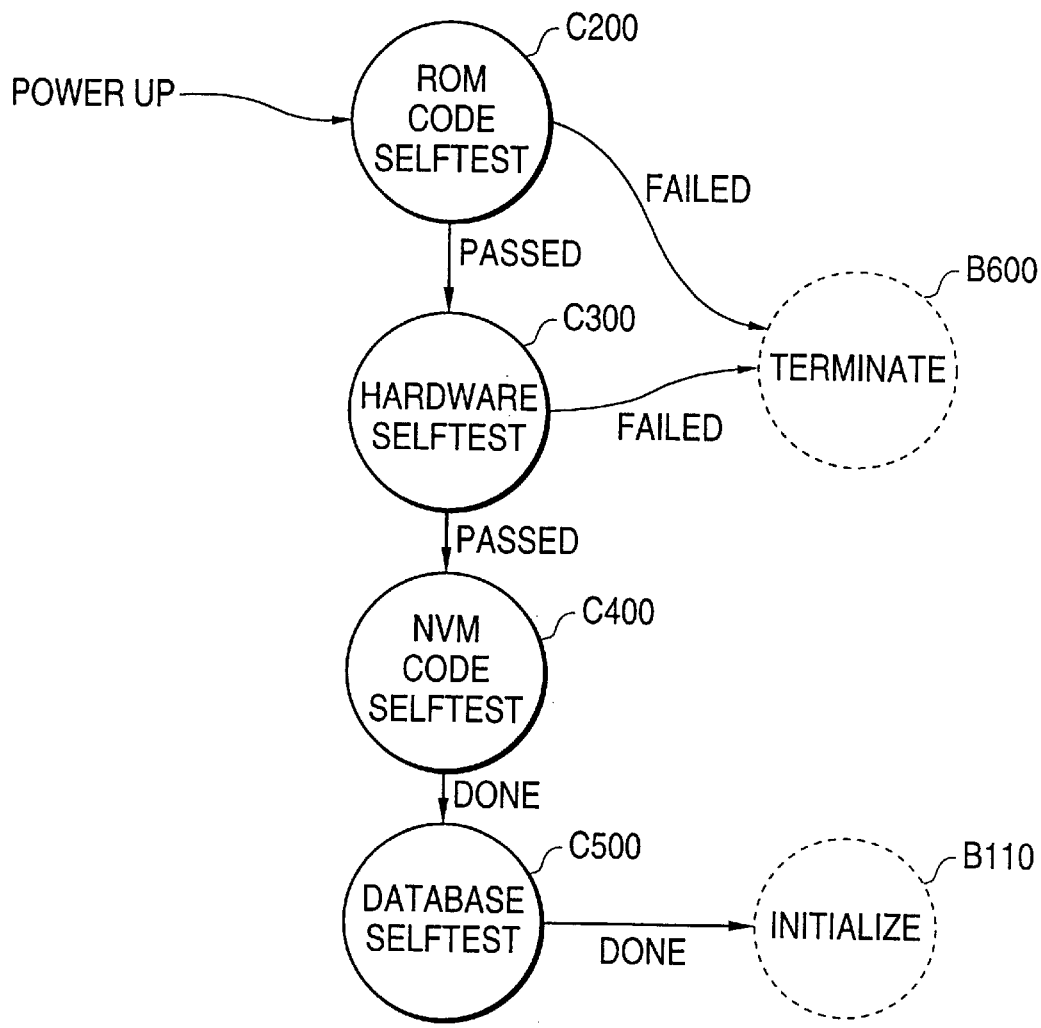
FIG. 7 is a state diagram of a selftest method according to the invention.

Selftest state B100 is entered when power is initially applied to the facsimile jack. For example, the application of power can cause the microprocessor to jump through address zero. At this time, a jump will be made to the selftest code located in ROM. In one embodiment according to the invention, selftest state B100 may provide for each of the following in the order listed:

1. ROM Code selftest
2. Hardware selftest
3. NVM Code selftest
4. Database selftest FIG. 7 is a state diagram of the selftest sub-states according to the above described embodiment. Upon power-up, the software enters a ROM code selftest state C200. Upon receipt of a "passed" event, the software moves to a hardware selftest state C300. In both the ROM code selftest state C200 and the hardware selftest state C300, if the software receives a "failed" event, the software moves to the terminate state B600. In the hardware selftest state C300, if the software receives a "passed" event, it moves to an NVM code selftest state C400. Upon receipt of a "done" event, the software moves to a database selftest state C500. The selftest is complete when the software next receives a "done" event and moves to the initialize state B110.

A flag can be maintained in a random access memory (RAM) for each selftest performed. In the case of the hardware selftest state C300, a flag can be maintained for each component of the hardware that is tested. In the case of database selftest state C500, a separate flag can be maintained for each database segment. The selftest flags provide a mechanism for a diagnostic query of the facsimile jack either from Local Control Mode (LCM), or remotely through the use of a modem interface. LCM and remote update are discussed below.

Each of the above selftest sub-states are described in more detail below.

Referring to the ROM code selftest state C200, when the facsimile jack is initially powered-up it validates the ROM code segment stored in ROM. This typically occurs prior to any other tests because if the ROM code is not valid, the code contained within it may not be able to perform the rest of the selftests or carry out normal operation.

ROM code validation can be done, for example, by calculating a 3 byte checksum of all bytes of the ROM code bytes except the last 3 and comparing the computed checksum to a 3 byte checksum value that can be stored as the last 3 bytes of ROM. By way of further example, the 8051 family of microprocessors has 4K of on-chip read only memory, ROM. The last 3 bytes of this ROM, corresponding to hexadecimal memory addresses FFC-FFF, can be reserved for the 3 byte ROM checksum. The checksum can be the 3 least significant bytes of the ROM bytes from memory addresses 0 through FFC added together. The ROM checksum would be calculated and stored in FFD-FFF when the code is initially programmed into ROM.

If the ROM code selftest fails, the software assumes that the facsimile jack will not be capable of performing any other functions and enters the terminate state B600. Thus, if the ROM code selftest fails, the facsimile jack will not respond to local control mode commands. If the ROM code selftest passes, the software performs a hardware selftest.

Referring to the hardware selftest state C300, the software can perform a selftest of all the on-board hardware components that are capable of being tested. For example, hardware selftest may include testing basic microprocessor functionality, timers, on-board random access memory (RAM), external RAM, NVM, modem loopback, and DTMF loopback.

Depending on which segment of hardware selftest fails, the software may or may not be able to continue on to the initialization phase. If enough hardware is functional for the facsimile jack to allow it to enter Local Control Mode, the software can move through the initialize state B110 and enter the control state B120. This allows for diagnostic query of the facsimile jack.

If a disabling hardware error is detected, the software generates a signal so that the terminate state B600 can illuminate appropriate LEDs indicating that the nature of the hardware failure and the facsimile jack can disable itself such that the attacked fax device functions as if the facsimile jack were not installed.

Referring to the basic microprocessor functionality test, the selftest of an embodiment using an Intel 8051 microprocessor may include an accumulator test, an R0 register test, an R1 register test, an interrupt pending register test, and a processor status word test. Typically, if the microprocessor register test fails, processing will enter the terminate state B600.

Referring to the timer test, each of the microprocessor timers can be tested for functionality and accuracy. Typically, if the timer test fails, processing will enter the terminate state B600.

Referring to the on-board RAM test. Each byte of the microprocessor on-board RAM will be tested. This may include, for example, writing the pattern "AA" hexadecimal to all memory locations and then performing a bit walk test for each byte of RAM starting with memory address 02. Note that, in an embodiment using an Intel 8051 microprocessor, memory addresses 00 and 01 correspond to registers R0 and R1 respectively and would have already been tested. After performing the bit walk test of a byte of RAM, all following bytes of RAM can be tested to insure that the "AA" which was originally written has not been modified. Upon completion of the on-board RAM test, all bytes of RAM can be initialized to zero. Typically, if the on-board RAM test fails, processing will enter the terminate state B600.

Referring to the external RAM test, each type of the external RAM accessible by the microprocessor will be tested. This may include, for example, writing the pattern "AA" hexadecimal to all external memory locations and then performing a bit walk test for each byte of external RAM. After performing the bit walk test, the following bytes of RAM can be tested to insure that the "AA" has not been modified. Upon completion of the external RAM test, the external RAM can be initialized to all zeros. If the external RAM test fails, processing can proceed to the control state B120 but, typically, will only respond to requests to enter Local Control Mode state B300.

The NVM memory test determines if the NVM is functioning correctly. This may include, for example, testing whether a value can be stored to NVM and then retrieved correctly. Testing to insure that data previously stored to NVM is still correctly stored in NVM is described below in conjunction with the database selftest. Testing NVM functionality may also require verifying that in the event of power-down, data in NVM is restored upon power-up. For this reason, a segment of NVM (NVM selftest segment) can be allocated for testing.

The NVM selftest segment may include, for example, two pattern bytes, one data valid byte, one length byte, one page byte, two starting address bytes, and twenty five data bytes, for a total of thirty two bytes. In order to determine if data NVM has been initialized, the two pattern bytes can be written to the NVM selftest segment upon initial setup. These bytes can be stored as the first two bytes of the NVM selftest segment.

During the hardware selftest state C300, the software can read the first two bytes of NVM looking for a pattern, for example, "A5 5A." If the pattern is not detected, it will be assumed that the NVM has not been initialized and all values in NVM can be set to zero. If the pattern bytes "A5 5A" are detected, the data valid byte can be checked to see if it is set to "1". If it is, the number of bytes indicated by the length data byte stored in the twenty five data bytes can be written to NVM starting at the address indicated by the two starting address bytes. This operation accounts for the fact that the NVM could have been interrupted by a power-down prior to completion of a write operation.

A non-destructive test of each byte of NVM can then be performed. The non-destructive test may include, for example, writing a fixed pattern to the NVM selftest segment and reading it back again. If the pattern is not read back as it was written, NVM will have failed selftest and the appropriate selftest status bit will be set, the pattern bytes will be set to zero and the hardware failed diagnostic LED illuminated. If the NVM selftest segment passes, all remaining bytes of NVM will be tested. This will be accomplished by reading, for example, up to 16 bytes of NVM and storing them into the NVM selftest segment along with the starting address of where the bytes were read and the number of bytes read. The data valid byte will be set to 1. A bit walk test of the 16 byte NVM segment will be performed. If the test passes, the original NVM bytes will be re-written back to the NVM segment and the byte indicating that a selftest segment is being tested will be cleared. This process can be repeated until all bytes of NVM are tested. Typically, if NVM memory test fails, processing will proceed to the control state B120, but will only respond to requests to enter Local Control Mode.

Referring to the diagnostic LED test, this may include, for example, illuminating each of the diagnostic LEDs in succession 4 times with each illumination separated by 250 milliseconds. This is a visual test which allows a user or technician viewing the LEDs to determine whether or not all the LEDs are functional.

Referring to the DTMF loopback test, the loopback procedure is dependent on the DTMF component chosen. If DTMF loopback is supported, the DTMF loopback test can be performed. Typically, if the DTMF loopback test fails, processing will enter the terminate state B600 because the software will not be able to enter Local Control Mode because the hardware cannot decode a phone number entered by an attached fax device.

Referring to the modem loopback test, the loopback procedure is dependent on the modem component chosen. If modem loopback is supported, the modem loopback test can be performed. Typically, if the modem loopback test fails, processing will enter the terminate state B600 because the facsimile jack will not be able to redial an outgoing number if it were to intercept it.

Referring to the NVM code selftest state C400, if NVM code selftest fails, the control software will assume the facsimile jack has not been setup. The software will continue with initialization state B110 and enter control state B120, but will then wait for a request to enter Local Control Mode state B300. During this time, the software typically will not reroute any calls to the network but may accumulate statistical data on incoming and outgoing fax transmissions.

NVM code memory validation can be done, for example, by calculating a 3 byte checksum of all bytes of the NVM code memory, including unused bytes, except the last 3 and comparing the computed checksum to the 3 byte checksum that will be stored as the last 3 bytes of NVM code memory. If the NVM code selftest fails, the software may not be capable of performing normal operation and typically will disable itself such that the attached fax device functions as if the facsimile jack were not installed. Under this condition, the software will illuminate the appropriate diagnostic LED and wait for a command to enter the Local Control Mode state B300 to be set up.

Referring to the database selftest state C500, numerous data structures may be stored in NVM and will need to be tested. The software can perform a validation of each of the data structures stored in NVM. To facilitate this, a table is provided which contains the segment number, NVM page, starting address, length and checksum of the structures that need to be validated. The table may also contain a status indicating if the segment is valid or not.

Any segments whose status indicates the segment is not valid will not be included in the checksum data. If the status indicates the structure is valid, a checksum of the structure will be done and the checksum compared to that stored in the structure. If the checksums are equal, the status will be left to indicate success. If the checksums are not equal, the status will be set to indicate failure.

The first segment in the table, for example, can be stored as the first 8 bytes of NVM on the first page of NVM and can point to the database selftest table itself as segment number 0. This entry would not include the first 8 bytes of the table for checksum purposes. Typically, the remainder of the table would be stored directly following the first 8 bytes. A status indicating whether or not each data segment passed or failed validation may be kept and would be available for diagnostic purposes.

Referring to the initialize state B110, RAM variables and hardware components can be initialized during this state. Each component that requires initialization would have an entry point that could be called from the initialize state B110 to perform the initialization for that component. For example, if the NVM code is valid, an initialize entry point in the NVM code will be called. From this entry point, other initialization routines can be called for all modules in NVM code segment. This allows initialization of variables and hardware if necessary. If no initialize routines are required for the NVM code segment, the initialize routine could still be provided and would just perform a return.

By way of further example, the following components of the facsimile jack described in the related application entitled "FACSIMILE JACK FOR SELECTIVELY ROUTING A TRANSMISSION THROUGH A FACSIMILE NETWORK" typically require initialization at this point:

1. Timer Module
2. Communications Module
3. Relay-Hardware
4. Modem Hardware
5. Analog Switches
6. LEDs
7. SLIC Hardware
8. DAA Hardware
9. Tone Generation Hardware Upon completion of the initialize state B110, the control software enters the control state B120.

The control state B120 operates as a background loop that monitors the state of select inputs and when a change in detected, transfers to the appropriate state to process the input change. The control state B120 can be divided between the ROM code segment and the NVM code segment. This can be facilitated by an entry point in the NVM code segment. The entry point can be called from the ROM code segment and the NVM code segment would end with a return. The NVM code entry point would only be called if the NVM code segment passes selftest.

Figure 8:
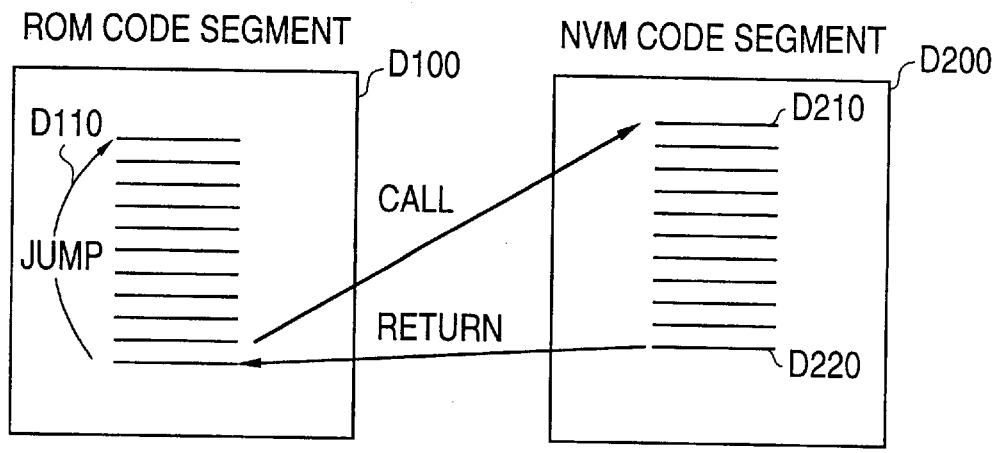
FIG. 8 shows a method for segmenting a software control loop used by to the invention.

FIG. 8 illustrates one embodiment according to the invention in which a control loop D110 is contained in a ROM code segment D100 and calls an NVM code segment D200 at entry point D210. The NVM code segment D200 ends with a return D220 to the ROM code segment D100.

In typical operation, the control state B110 will either wait for a ring indicator on the incoming line or an off-hook indication from the attached line. The control state B120 can also initiate a call on its own. This is called a callback and occurs in response to a callback event as described below. During periods of inactivity the control state B120 also performs background selftest of the data structures stored in NVM. This ensures data integrity for periods of prolonged operation of the facsimile jack.

A ring indication is sensed when a ring signal, corresponding to an incoming call, is detected on the telephone line. This triggers a "ring indicator" event and causes the software to transfer from the control state B120 to the incoming call processing state B400.

As discussed above, under certain circumstances the software can initiate an outgoing call on its own (a callback), even if there is not an outgoing fax transmission. Requests for a callback can be initiated either at the time of initialization or when a call is placed to the SmartPOP™. When a callback event is requested, the software will be instructed as to the event and the number to call to perform the callback. For example, an instruction from the SmartPOP™ may include calling back to the SmartPOP™ after reaching the maximum count on a statistical variable or at a specified time such as at 3:00 A.M. or 5 hours from the current time. The occurrence of the event triggers a "callback" event which transfers the software from the control state B120 to the callback processing state B500.

Predefined callback events can be processed by ROM code. Additional callback events can be incorporated into NVM code. If there is an outgoing or incoming fax transmission or if the software is in the Local Control Mode state B300, callback events can be noted and processed at a later time when there is no activity.

The facsimile jack senses an off-hook condition on the fax line when either the attached fax device or a connected telephone handset takes the line off-hook. The off-hook condition generates an "off-hook" event which causes the software to move from the control state B120 to the Smart-POP™ predial state B130.

The SmartPOP™ predial state B130 predials, for example, all but the last digit of the SmartPOP™ phone number. A source facsimile device will wait only a fixed amount of time to receive a response from a destination facsimile device (hereinafter "T1") before canceling the transmission (i.e. hanging up). The SmartPOP™ predial state B130 minimizes the amount of time required to connect to the SmartPOP™ if the call is going to be routed through the digital facsimile network.

In one embodiment of a method according to the invention, immediately upon entering the SmartPOP™ predial state B130, the software connects the receive and transmit portions of the telephone line to the modem and takes the telephone line off-hook. The software next connects the receive portion of the telephone line to the receive portion of the facsimile line. Both the modem and the attached facsimile device or handset will then detect a dial tone from the telephone line. It is important to note that the facsimile jack connects the receive portion of the telephone line to the receive portion of the facsimile line but does not connect the transmit portions. The transmit portion of the facsimile line is instead connected to the facsimile jack DTMF decode hardware. This allows the facsimile device to receive a dial tone without allowing the DTMF digits dialed to be transmitted to the telephone line.

A SmartPOP™ phone number can be entered during setup. If there is a PBX prefix, it can be added to the beginning of the dialed sequence. Once a dial tone is detected on the telephone line, the software initiates dialing the SmartPOP™ phone number by supplying the digits of the SmartPOP™ phone number to the modem DTMF generator. Coincident with the start of dialing, the software moves to the DTMF parse state B140. For example, concurrent operation can be achieved by spooling all but the last digit to a modem dialer, which can carry out the dialing independently. Alternatively, a timer can be used to signal when successive and/or remaining digits of the SmartPOP™ number can be dialed. This also happens coincident with DTMF parsing.

Certain conditions can suspend the predialing of the SmartPOP™. For example, the SmartPOP™ number might not be predialed if the facsimile jack has been locked out, a local control mode command has been issued to not route calls through the network, or the facsimile jack has not been registered.

In the DTMF parse state B140, the software expects to receive DTMF digits from either an attached fax device or a handset capable of generating DTMF tones. A handset will typically be used to perform facsimile jack setup but setup can also be performed through the use of the attached fax device if it is capable. Once the facsimile line is taken off-hook, the software waits for the first DTMF digit to be received. The DTMF parse state B140 decodes the entered DTMF digits and either enters the Local Control Mode state B300 or parses out the area code and exchange or national phone number and passes them on to the Dialing Processor state B150. The DTMF parser can also supply the country code to the Dialing Processor state B150.

If the software detects the appropriate DTMF digit sequence indicating that it is to enter Local Control Mode, it will immediately place the telephone line back on-hook.

If at any time, the facsimile device line is placed on-hook (i.e. hung up) prior to receiving a completely parseable DTMF sequence, the DTMF digits received up to that point will be discarded, the telephone line placed on-hook, and the control state B120 will be entered.

The DTMF parse state B140 recognizes PBX prefixes and suffixes and determines the destination phone number. The DTMF parse state B140 also parses 10 digit local numbers. This may be required for overlapping area codes which are currently in use and for future compatibility with dialing trends.

Numbers beginning with 011 and 01 are treated as international numbers. Domestic phone numbers can be processed by the software according to one of the following formats (Spaces are not significant. [ ]=optional parameter.)

| [PBXCode] | | | NXX | XXXX[Suffix](A) |
| [PBXCode] | 1 | | NXX | XXXX[Suffix](B) |
| [PBXCode] | | NPA | NXX | XXXX[Suffix](C) |
| [PBXCode] | 1 | NPA | NXX | XXXX[Suffix](D) |

The PBXCode is an optional parameter which is used to access an outside line from within a PBX. This number is not passed to the local exchange. The Suffix is an optional parameter, such as a billing code. This number is not relevant to the local exchange. Flags in the facsimile jack setup will indicate whether prefixes and suffixes are included in dialed numbers.

Under current standards, no general assumptions can be made about either the formats or the values of the NPA codes or the NXX codes (other than that neither can begin with a "0" or a "1"). A domestic number can be described by the following regular expression:

$$[(0..9)][1][(2..9)(0..9)^2](2..9)(0..9)^2(0..9)^6][(0..9)]$$

That is, 1) an arbitrary string of the digits "0" through "9", 2) an optional "1", 3) an optional NPA code of the form MXX (where M is one of the digits "2" through "9", X is one of the digits "0" through "9"), 4) a number of the form NXX XXXX, followed by 5) an arbitrary string of the digits "0" through "9". Portions 2 through 4 can be described as a BellCore portion of the number. The prefix and suffix numbers are shown with redundant option brackets to indicate that their presence or absence may be known before dialing begins. The software extracts from an input number the NPA code, if any, and the NXX code (if no NPA code is supplied, the local area code can be assumed to be the NPA code).

In the case of fixed PBX prefixes, the prefix can be input into the software during setup. The software discriminates between multiple PBX codes for local and long distance dialing by maintaining a list of these prefixes. The software then parses them out of incoming DTMF sequence to extract the NPA and NXX codes. The DTMF parser also parses off the dialing suffix, if entered. The parameters that can be passed on to the dialing processor state B150 for domestic calls include the following:

1. PBX prefix
2. Suffix
3. Area Code
4. Exchange.

Numbers beginning with 01 are operator assisted international calls, and are passed through by the software as a non-network call. Numbers beginning with 011 are direct dial international numbers which can be routed over the digital network. In this case, the country code and the national phone numbers would also be extracted. The problem with separating the suffix from an input number is similar for both the international and domestic numbers. The parameters that will be passed on to the Dialing Processor state B150 for international calls include the following:

1. PBX prefix
2. Suffix
3. Country Code
4. National Phone Number

After the prefix and the leading "1" (if any) have been removed, the software can determine whether or not the telephone number is of NXX or the NPA NXX variety. For example, based on the length of the number, the software could tell which type it is because NXX type numbers have seven significant digits, and NPA NXX type number have ten significant digits. Information supplied at setup time determines how to handle the PBX suffix. For example:

1. In what situations a suffix code is present:
    a. Only when a "1" prefix is supplied.
    b. Only when the number is of the NPA NXX type. (In this case, numbers will either contain seven or ten+ suffix length digits.)
    c. Only for international numbers
2. The length of the suffix code (or, if variable, the range of lengths).

Referring to the dialing processor state B150, the software receives a country code and either an area code and an exchange, for North American numbers, or a national phone number, for numbers outside North America, and determines if the call should be routed through the digital facsimile network. If an area code is not supplied from the DTMF parser, the local area code, entered during setup, can be used.

The dialing processor first searches a list of numbers contained in a Network Exclusion Table that should not be routed through the network and determines if the number being dialed is within the list. If it is, the number will either be routed through the alternate service or the customer's long distance carrier. The Network Exclusion Table may indicate whether or not the number can be routed through the alternate service.

If the dialing processor determines that the number is not in the Network Exclusion Table, it then determines if the number gets routed through the network by performing a table lookup into either a North American Network Directory using the area code and exchange or an International Country Code table using the country code.

The following examples are special phone numbers that would also typically be treated as non-network calls:

1. N11 service codes.
2. Numbers beginning with 10. These are referred to as "directory assistance" calls.

If the number is serviced by the network the software transfers to the network processing state B160. If the number is not serviced by the network, the software transfers to either the alternate service processing state B170 or the non-network processing state B180.

Figure 9A:
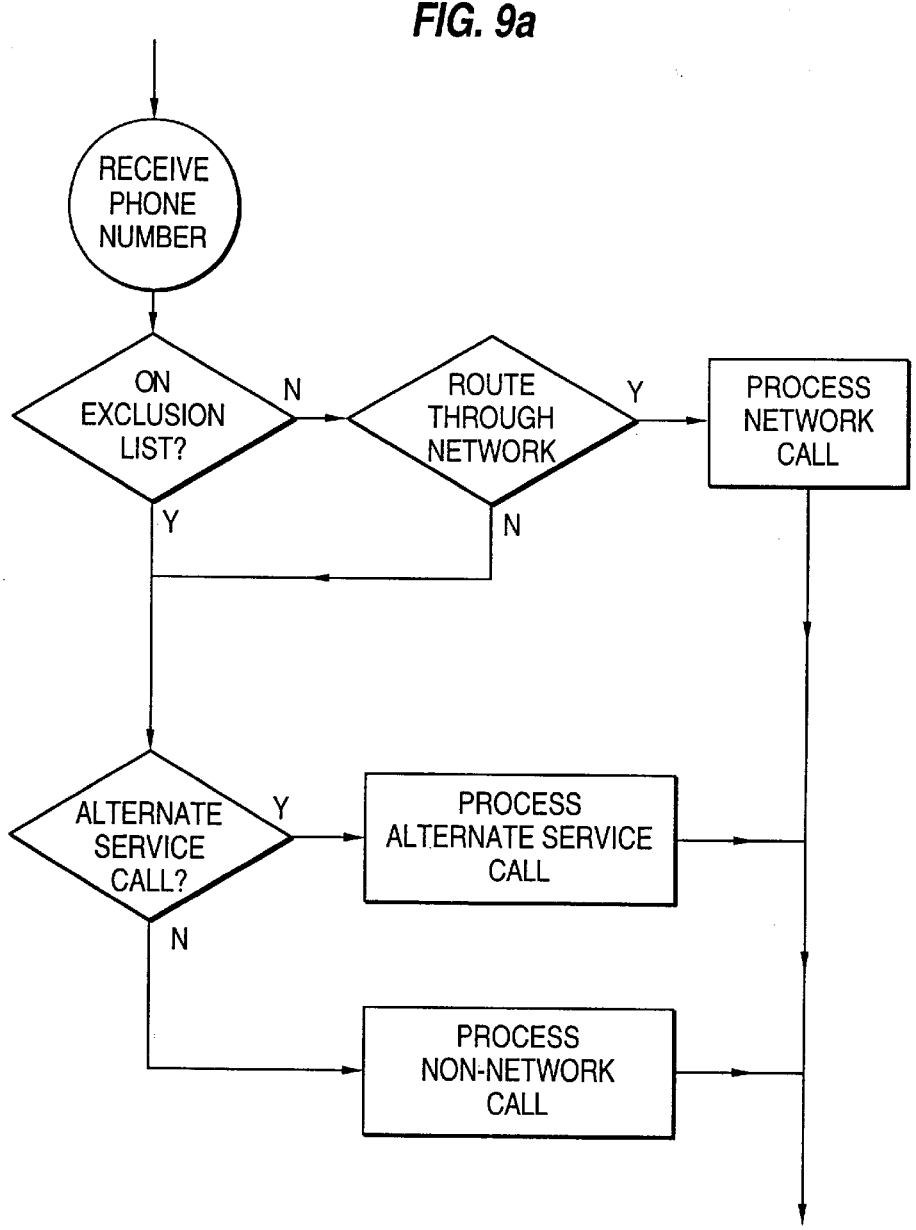
FIG. 9a is a flow diagram of a method for processing a destination phone number used by the invention.

FIG. 9a shows a flow chart of a method according to the invention for processing dialed numbers.

The non-network processing state B180 is reached when it is determined that the number dialed by the attached facsimile device is not serviced by the network or the alternate service. In this case, the software dials the destination number exactly as it was entered and connect the attached facsimile device to the outgoing line. At this point it appears to the attached facsimile device that it has dialed the number and the facsimile device negotiates the fax session. The software monitors the session to gather statistics. The software also monitors the on-hook signal from the facsimile line and when detected, places the telephone line on-hook. The software then moves to the update statistics state B200 and then returns to the control state B120.

Figure 9B:
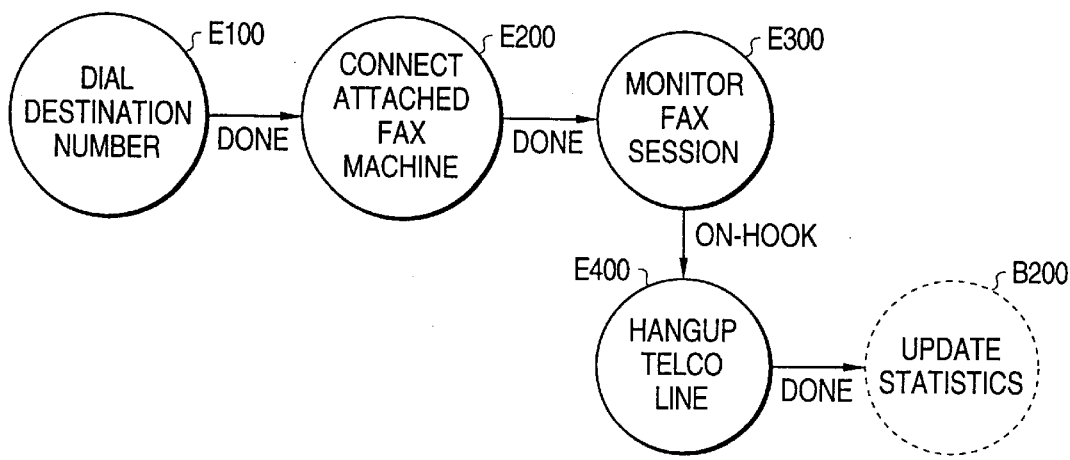
FIG. 9b is a state diagram of a method for routing and processing a non-network destination number used by to the invention.

FIG. 9b is a state diagram of the non-network processing sub-states. The software is initially in a dial destination number state E100. Upon receipt of a "done" event, the software moves to a connect attached fax device state E200. Upon receipt of a "done" event, the software enters a monitor fax session state E300. The software remains in this state until it receives an "on-hook" event, at which point it moves to a hang-up telco line state E400. Upon receipt of a "done" event, the software moves to the update statistics state B200.

The dial destination number state E100 dials the destination phone number exactly as it was received by the attached facsimile device. In the connect attached fax device state E200, the facsimile jack switches an analog switch, as described in the related application entitled "FACSIMILE JACK FOR SELECTIVELY ROUTING A TRANSMISSION THROUGH A FACSIMILE NETWORK," to connect the receive portion of the telephone line to the receive portion of the facsimile line. The software also connects the transmit portion of the facsimile line to the transmit portion of the telephone line. The monitor fax session state E300 monitors the fax session to accumulate statistical data. The software enters the hang up telco line state E400 when a on-hook indication is detected on the facsimile device transmit line, thereby causing an "on-hook" event. The facsimile jack then places the telephone line on-hook and the software moves to the update statistics state B200.

As discussed above, the alternate service processing state B170 is reached when it is determined that the number dialed by the attached fax device is not serviced by the network but can be serviced by an alternate service. Alternate service dialing may be, for example, two different forms, namely, routing using Feature Group B (FGB) or Feature Group D (FGD).

In FGB, for example, the software first dials a number of the form 950-XXXX (an FGB access number) and, when appropriate, dials a destination number. The attached facsimile device is then connected to the telephone line. It will appear to the attached facsimile device that it has dialed the original destination number and the facsimile device will then negotiate the fax session. The software will monitor the fax session to gather statistics. The software also monitors the on-hook signal from the fax device and when detected, the software places the telephone line on-hook. The software then moves to the update statistics state B200 before returning to the control state B120.

FGD alternate service processing can be, for example, identical to the non-network processing state B180 with the exception that a destination number is prefixed with 10XXX to select an alternate service carrier. XXX is a Carrier Identification Code, CIC.

Figure 10:
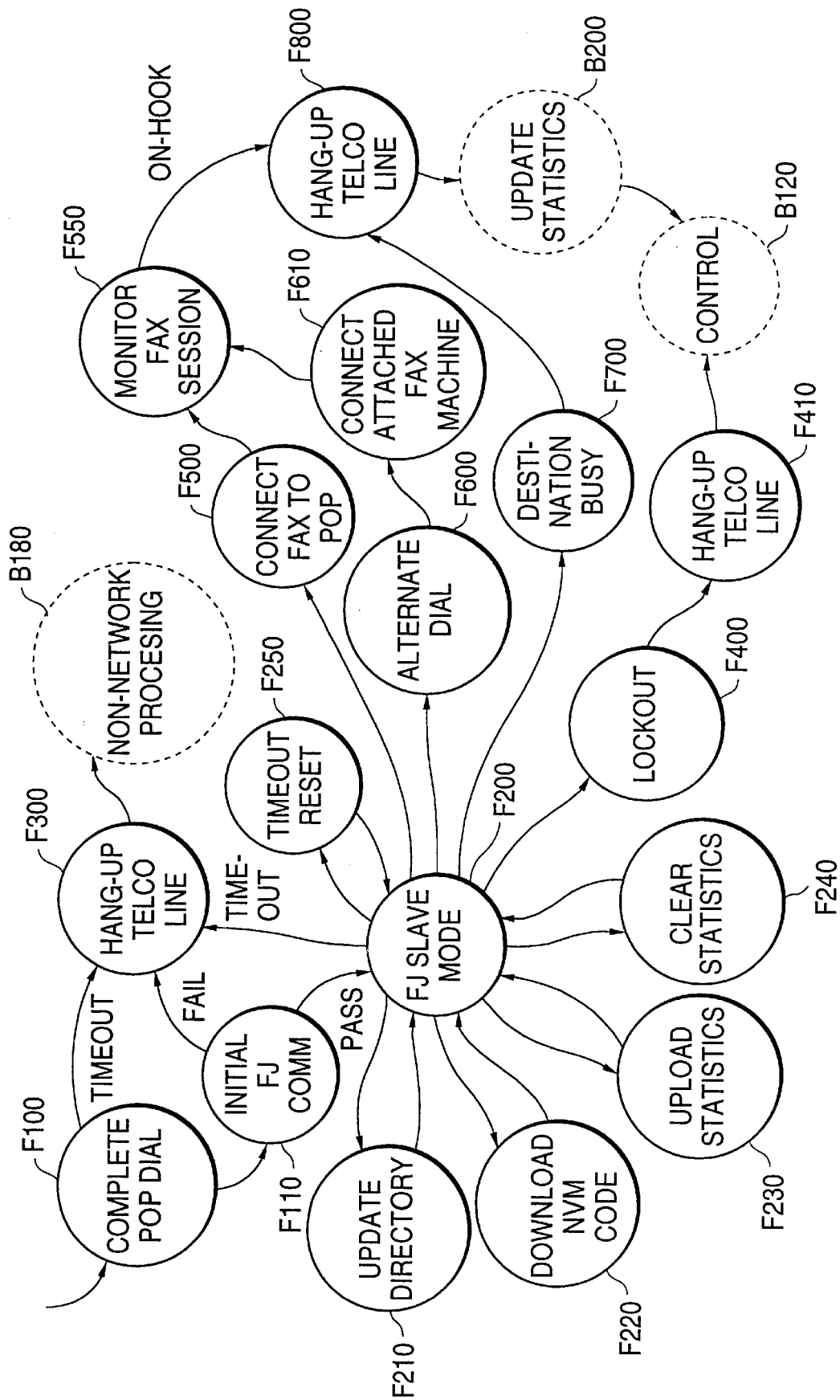
FIG. 10 is a detailed state diagram of a method for processing a network destination number used by the invention.

The network processing state B160 is reached when it is determined that the outgoing call placed by the attached facsimile device can be serviced by the network. FIG. 10 is a state diagram of the network processing sub-states.

The complete SmartPOP™ dial state F100 dials the remaining digits, if any, of the SmartPOP™ phone number. For example, if the SmartPOP™ predial state B130 dialed all but the last digit, the complete SmartPOP™ dial state F100 dials the last digit of the SmartPOP™ number. If there is a PBX suffix it will be added after the last digit of the SmartPOP™ number. Upon completion of dialing the last digit, the telephone line is monitored for a carrier from the SmartPOP™. Once the carrier is detected, the initial software communications state F110 will be entered. If a carrier is not detected from the SmartPOP™ in $T_{Carrier}$ seconds a "timeout" event is generated, causing the software move to the hang-up TELCO line state F300. This state waits $T_{Hangup}$ seconds, then either routes the call through an alternate service or enters the non-network processing state B180. Designation of whether or not an alternate service will be attempted can be done during setup. All values for time-outs will have a default but can be programmable from either Local Control Mode or through communication with the SmartPOP™.

The initial FJ comm state F110 is entered when a carrier is detected from a number that the software expects to communicate with. This is typically a SmartPOP™ but can also be any device capable of communicating with the protocol as described in related application "POINT OF PRESENCE (POP) FOR A DIGITAL FACSIMILE NETWORK." Upon initial connection, the facsimile jack sends a message with, for example, the following information:

1. FJ serial number—this number uniquely identifies the facsimile jack. For example, this number can be a uniquely coded binary number that is stored in NVM.
2. Validation Code—a encrypted code for verifying that the facsimile jack is registered to use the digital facsimile network.
3. Destination fax device phone number—this is used by the SmartPOP™ to route the call to the appropriate destination SmartPOP™ and to call the destination fax device. For example, this number can be in BCD format and be between 11 and 25 bytes.
4. Residual T1—amount of time left before attached fax device will terminate the fax attempt. For example, this can be binary number indicating the number of 5th of seconds left.
5. Software or hardware FJ destination—this value indicates to the SmartPOP™ whether or not this is a hardware or software implemented facsimile jack.

Once the software has sent the initial message to the SmartPOP™, it enters the FJ slave mode state F200. In this state, the software waits for commands from the SmartPOP™ and executes them. Upon entering FJ slave mode state F200, the software starts a timeout timer. If a command is not received prior to the timeout time expiration, the software moves to the hang-up TELCO line state F300. The software then, for example, waits one second and moves to the non-network processing state B180.

FIG. 10 shows some exemplary slave mode commands that can be requested of the facsimile jack. For a list of further slave mode commands see the related application titled "POINT OF PRESENCE (POP) FOR A DIGITAL FACSIMILE NETWORK."

The update directory state F210 is entered when a SmartPOP™ command instructs the software to update the North American Network Directory, or network directory for short. Updates to the network directory can be made, for example, on an area code basis. The SmartPOP™ can also send a checksum of the updated area code information. The software writes the updated directory segment to an unused segment of NVM and compares the calculated checksum to that received from the SmartPOP™. If they are equal, the software sends a "passed" message back to the SmartPOP™ and updates the pointers to point to the updated area code information. If they are not equal, the software sends a "failed" message back to the SmartPOP™ and uses the previous data, if any, for that area code. When completed, the software returns to the FJ slave mode state F200.

The download NVM code state F220 state is entered when the software receives a command from the SmartPOP™ to download NVM code. The SmartPOP™ message may contain, for example, the address in NVM that the data should be written to and the number of bytes to write. Multiple Download NVM Code messages can be sent to update all or part of the code segment. The final message can be a checksum. Once a NVM code segment has been downloaded, the SmartPOP™ can instruct the software to perform a checksum of the NVM code. The software will then send back the result of the checksum operation. If the NVM code segment is valid, the download was successful. If the download was not successful, the SmartPOP™ can instruct the software to re-download the segment until checksum is passed.

The upload statistics state F230 is entered when the software receives an "upload statistics" command from the SmartPop™. When this command is received, the software will transmit the statistics data structure stored in NVM to the SmartPOP™. The data can be, for example, uploaded unformatted and the receiving agent would format and extract the contents of the statistics data structure. The upload statistics message can contain a checksum stored at the end of the data structure. This allows the receiving agent to determine if the data was received correctly or not.

The clear statistics state F240 is entered when the software receives a "clear statistics" command from the SmartPOP™. When received, the software initializes the statistics data structure stored in the NVM. The "clear statistics" command is typically issued after an "upload statistics" command has been executed successfully.

The connect fax to SmartPOP™ state F500 is entered when the software receives a "connect fax to SmartPOP™" command from the SmartPOP™. This instructs the software to connect the fax line directly to the telephone line. This then allows the attached fax device to transmit a fax to the SmartPOP™. In the hardware example described in the related application entitled "FACSIMILE JACK FOR SELECTIVELY ROUTING A TRANSMISSION THROUGH A FACSIMILE NETWORK," for example, the software will instruct the hardware to connect the transmit line from the DAA to the transmit line of the SLIC and the receive line from the DAA to the receive line of the SLIC. The software also instructs the hardware to connect the modem to the appropriate receive or transmit portions of the telephone line to monitor the fax session.

The alternate dial state F600 is entered when the SmartPOP™ is unable to complete a request to route a transmission for the facsimile jack. Reasons for failure could include, for example, network congestion or an error in the network. The SmartPOP™ may indicate the alternate method. An exemplary list of alternate dialing options includes the following:

1. Use alternate service—the FJ should disconnect from the SmartPOP™ and immediately route the call through the alternate service.
2. Use customers long distance—the FJ should disconnect from the SmartPOP™ and immediately route the call using the customers long distance carrier.
3. Indicate busy to fax line and when the fax device attempts to redial the same number and:
    a) retry through the SmartPOP™ b) retry through alternate service c) retry through customers long distance service.

In addition, the SmartPOP™ may determine that the call should not be routed through the network. This could happen for a number of reasons such as the number being invalid or the area code and exchange no longer being serviced by the network. In the event the SmartPOP™ indicates a call should not be routed through the network it will indicate to the software, if possible, the reason for failure and the alternate dialing method.

Reasons the SmartPOP™ would reject a call through the network include the following:

1. Number invalid—not a valid fax number (voice, number not in service, etc.)
2. Invalid directory request—area code and/or exchange are not serviced by the network.

If the software receives an indication that an area code is not serviced by the network, it can update the network directory to exclude that area code. If the indication is that an exchange within an area code is not serviced, the software can modify that area code in the network directory to exclude that exchange. These actions reduce the number of invalid calls being presented to the network.

For numbers that are invalid, the software maintains a list of numbers that should not be routed through the network. These numbers can be routed either through the alternate service or the customers long distance carrier. The SmartPOP™ may select the appropriate routing method. The selection may be based on, for example, the amount of remaining time, $T1_{Remainder}$, for the call to be completed if it is going to be routed immediately. If the SmartPOP™ determines there is not enough time to route the call immediately, it may instruct the software to provide a busy tone to the fax line and to route the call when it is redialed.

The destination busy state F700 is entered when a command is received from the SmartPOP™ indicating that the destination fax device is busy. The command will also instruct the software what to do if the number is redialed. The available options include redial through SmartPOP™, utilize customers long distance carrier, and route through alternate service. When this command is received, the software can generate a busy tone to the attached fax device and wait for the fax line to go on-hook. When the line is placed on-hook, the software places the telephone line on-hook. If the SmartPOP™ has instructed the software to either utilize the customers long distance carrier or route through an alternate service, the software can store the number being dialed and use it for comparison when it is redialed.

The SmartPOP™ has the ability to disable the software from calling the SmartPOP™, for example, if either the user has discontinued subscription to the service or has not paid their bill. A mechanism may also be provided to re-enable the software remotely so that the customer can get reconnected upon payment or resubscription to the service. This can be done, for example, through a special DTMF sequence issued by the user. For reactivation of service, the DTMF sequence will instruct the software where to call. The software can then communicate with the device on the other end to, for example, get a new activation code and optionally reprogram setup values and/or download an updated copy of the network directory.

The SmartPOP™ also has the ability to instruct the software to selectively access the network. This will typically be done during peak network access times. When a facsimile jack calls into the SmartPOP™, the SmartPOP™ can instruct the software to only call in 1 time out of X. X is dependent on, for example, the network traffic. Selective access may also have a corresponding timeout that will typically coincide with the peak calling period. Once the software reaches the timeout it will enter normal mode operation. There may also be provisions, for example, for making selective access permanent for certain periods of specific days such as Monday through Friday. There may also be provisions for making selective access permanent for all call access. Statistics can be acquired via the software, for the number of calls that could have gone through the network and didn't because of selective access. This will allow for updating facsimile jacks that are designated as selective access to be designated as full access based on, for example, anticipated usage.

The timeout reset state F250 is entered when a SmartPOP™ command instructs the software to reset the Slave Mode timeout timer so that it does not timeout. This allows the SmartPOP™ additional time to process requests while the software retains an indication that the communication session is still valid.

Figure 11:
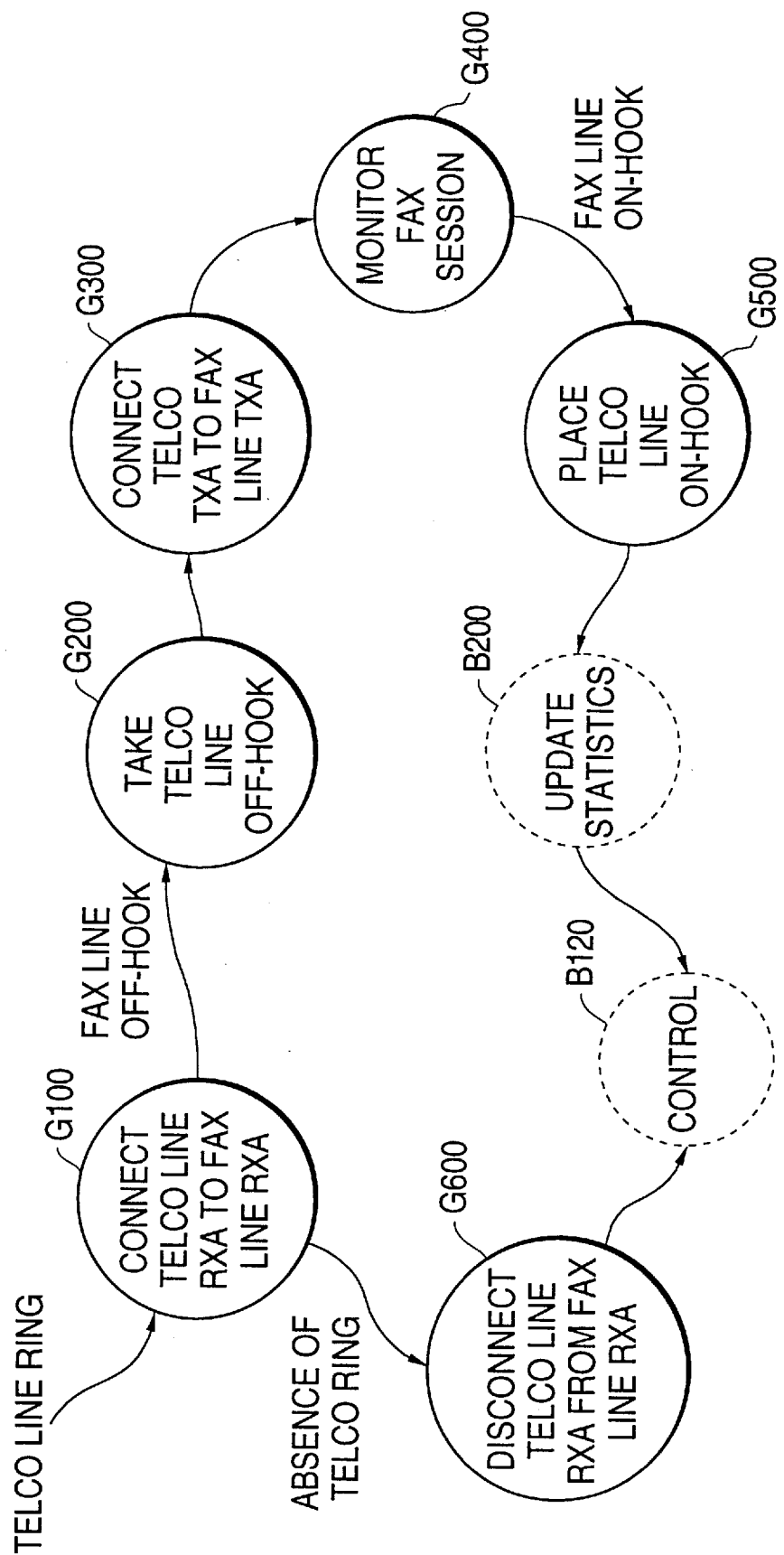
FIG. 11 is a state diagram of a method for processing an incoming facsimile transmission used by the invention.

Referring back to FIG. 6a, the incoming call processing state B400 is entered when the facsimile jack detects a ring indication on the telephone line thereby causing a "ring indicator" event. This is typically an indication that there is incoming fax. FIG. 11 shows one embodiment of the sub-states for incoming call processing. After detecting an incoming call, the software, in state G100, instructs the facsimile jack to connect the receive portion of the telephone line to the receive portion of the facsimile line, thereby passing the ring indication on to the facsimile device. The software then waits for one of two possible events, "fax line off-hook" or "absence of TELCO ring." If the facsimile device does not take the line off-hook before there is an absence of ring on the telephone line, the facsimile jack will generate an "absence of TELCO ring" event. This event causes the software to move the state G600 in which the software instructs the facsimile jack to disconnect the telephone line receive from the fax line receive. The software then returns to control state B120.

If the facsimile machine takes the line off-hook, the facsimile jack will generate a "fax line off-hook" event. This causes the software to move to state G200 in which the software instructs the facsimile jack to take the telephone line off-hook. In state G300, the facsimile jack is instructed to connect the transmit of the TELCO line to the transmit of the fax line. The software then monitors the fax session for statistical data in state G400. During fax session monitoring, the facsimile jack looks for the fax line to go on-hook. When it does, it generates a "fax line on-hook" event which causes the software to move to state G500. The facsimile jack is then instructed to place the telephone line on-hook and processing proceeds to the statistics state B200 and then returns to the control state B120.

Referring again to FIG. 6a, local control mode state B300 is entered through the use of a DTMF sequence that is not used for normal telephone dialing. The DTMF digits can be entered by, for example, attaching a telephone handset to the fax line or by utilizing a fax device connected to the fax line if it is capable of generating the appropriate tones. The local control mode state B300 allows for initial facsimile jack setup and also facilitates debug and diagnostics. Typically, these operations occur locally at the customer site by an operator or technician.

Completion status for commands issued in the local control mode state B300 may be done, for example, through the use of a tone generator connected to the receive line of the facsimile device. A device equipped with a speaker (i.e., a speaker phone) may be used to hear the status tones. In the foregoing example, it would not be necessary to hear the status tones to successfully execute LCM commands.

Figure 12:
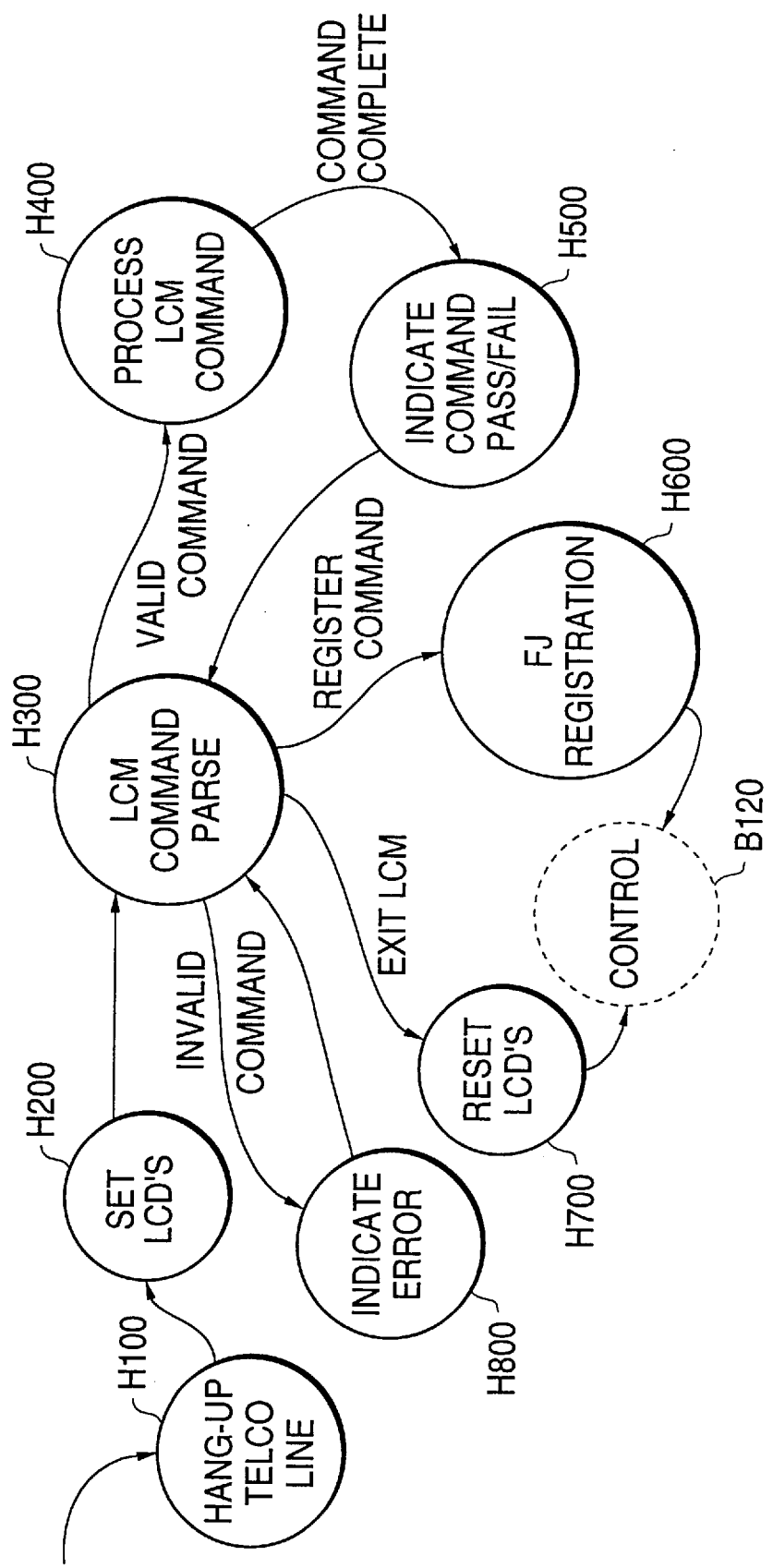
FIG. 12 is a state diagram of a method for processing local commands used by the invention.

FIG. 12 shows a state diagram at one embodiment of local control mode sub-states. In state H100, the telephone line will be placed on-hook (it was taken off-hook in the Smart-POP™ predial state B130). The software then moves to state H200 which instructs the facsimile jack to illuminate the diagnostic LED's with the appropriate code indicating that the software has entered local control mode. The state of the LED's prior to entering LCM can be saved so that it can be restored upon exit.

The LCM command parse state H300 parses the DTMF digits. For example, the DTMF data can be parsed as it arrives. The parser determines if a valid LCM command has been entered. If not, a "invalid command" event is generated and the software moves to state H800 where an error status is signaled. If a valid command is entered, a "valid command" event is generated. In this case, the software moves to state H400 where the LCM calls a routine to process the LCM command.

In one embodiment of a method according to the invention, the parser receives data from a DTMF decoder and passes the data through to the dialing processor unless the data is delimited by pairs of a guard sequence. The guard sequence may be, for example: "*#*". Using this guard sequence in the following string of digits: "123*#*456*#*789", the digits "123789" would be emitted to the dialing processor, and the digits "456" would be emitted to the local command processor. Within the local command sequence, the "#" symbol, for example, can also be used as an escape character, in order to distinguish commands from digits. For example, the local command sequence "#2" causes Command 2 (whatever that may be) to be executed, and the digits "#2" are not emitted. A "#" symbol can be generated within a local command by the use of two "#" symbols in a row: "##" equals "#". In this example, the "*" symbol is not escaped, and the input sequence "#*" causes "#*" to be emitted (also, "##*" is equivalent to "#*").

Command 0 can be a special "end of data" command which is used to signal the end of input to a command which has variable length parameters. Command 0 is used when it is necessary to string together multiple commands within the same local command sequence (normally, the ending "*#*" delimits both the data and the command sequence). For example, suppose a customer's PBX required a dialing prefix of "#9", and that Command 2 was the command to set the local dialing prefix. Either of the following sequences would place the software in local command mode, set the PBX prefix to "#9", and return to normal dialing mode:

*#*#2##9*#* or

*#*#2##9#0*#*

The following state device is an embodiment of a method for parsing digits according to the invention which can parse DTMF decoder output and direct output to either the dialing processor or the local command parser (LCP). Note that this design permits continuous, simultaneous use of the dialing processor and the local command processor. The states which represent data inside the guard sequences are marked by comments. If it is required that the dialing processor and the local command processor be modally exclusive, the LCP can be activated and deactivated at these points.

The state-device syntax is defined as:

| State | Recchar / EmitChar / NewState | ; Comment. |
|---|---|---|
| | RecChar / EmitChar / NewState | |

Where:

| RecChar = | Character received from the DTMF decoder. |
|---|---|
| EmitChar = | Character(s) emitted. |
| NewState = | State after emitting character. |

Symbols:

| $D_i$ = | One of the digits 0–9. |
|---|---|
| $(D_i)$ = | Emit the character $D_i$ to the dialing processor. |
| $[D_i]$ = | Emit the character $D_i$ to the LCP. |
| $CD_i$ = | Cause the command processor to execute command $CD_i$. |
| e = | Emit nothing. |

The state device is defined as follows:

| S0: | $D_i$ | / | $(D_i)$ | / | S0 | |
|---|---|---|---|---|---|---|
| | # | / | (#) | / | S0 | |
| | * | / | e | / | S11 | |
| S11: | $D_i$ | / | (*$D_i$) | / | S0 | |
| | # | / | e | / | S12 | |
| | * | / | (*) | / | S11 | |
| S12: | $D_i$ | / | (*#$D_i$) | / | S0 | |
| | # | / | (*##) | / | S0 | |
| | * | / | e | / | S21 | ; Got beginning "*#*". |
| S21: | $D_i$ | / | $[D_i]$ | / | S21 | |
| | # | / | e | / | S22 | |
| | * | / | e | / | S23 | |
| S22: | $D_i$ | / | $[CD_i]$ | / | S21 | |
| | # | / | [#] | / | S21 | |
| | * | / | [#] | / | S23 | |
| S23: | $D_i$ | / | [*$D_i$] | / | S21 | |
| | # | / | e | / | S24 | |
| | * | / | [*] | / | S23 | |
| S24: | $D_i$ | / | [*$CD_i$] | / | S21 | |
| | # | / | [*#] | / | S21 | |
| | * | / | e | / | S0 | ; Got ending "*#*". |

Commands in LCM include RAM read, RAM write, FJ registration and a request to exit LCM. For example, a sequence of LCM RAM read and RAM write commands can initialize local operating parameters for the facsimile jack.

To enable access to the network, the facsimile jack must be registered. This is to prevent unauthorized access and to insure that calls made through the network are billed correctly. The facsimile jack would typically be connected to the telephone line in order to perform registration. The fax device would be connected to the fax line.

The registration sequence can be initiated from LCM. The registration sequence will instruct the software that the next attempt at sending a fax will be for registration purposes. When the number is entered and the fax attempted, the software will not actually dial the number or send the page. It will hold the fax line and wait for the attached fax device to timeout. This time will be the T1 for the attached fax device. Once T1 has been determined, the software will dial the registration number and initiate a communications session. The registration number may correspond to a SmartPOP™, a Network Operations Center (NOC), or other device that conforms to the communication protocol.

After initial communications, the facsimile jack becomes a slave and enters FJ slave mode state F200. SmartPOP™ commands can then be sent to the software to read, write, upload or download information. For example, the software may be instructed to download the North American Network Directory, International County Code Table and software updates if any. Additional setup variables may also be downloaded during the registration phase. Upon completion, the software will place the telephone line on-hook.

The delivery of registration information may be distributed throughout the network at each of the SmartPOP™s. The management of that information can be centralized at a particular network host.

Referring back to FIG. 6a, the callback state B500 is entered when a "callback" event is detected. A "callback" event may include time expirations or flags that can be set and which are detected by the control state B120. Some typical situations that a FJ would perform a callback include:

1. Statistical Upload
2. Network Directory Update
3. International Directory Update
4. Download NVM Code
5. Orphan Callback events based on time can have a resolution of seconds, minutes or days.

When a callback event is requested, the requesting entity (i.e. the SmartPOP™) will indicate the type of call back and the event that triggers the callback. The information will be stored and transmitted to the called number when the callback event occurs.

Once the software has initiated a callback to the SmartPOP™ or other callback number, it will enter the FJ Slave Mode state F200. If the facsimile line is taken off-hook while in callback mode, the facsimile jack can generate a busy tone to the attached facsimile device. The busy tone can be ceased when the facsimile line is placed on-hook.

Figure 13:
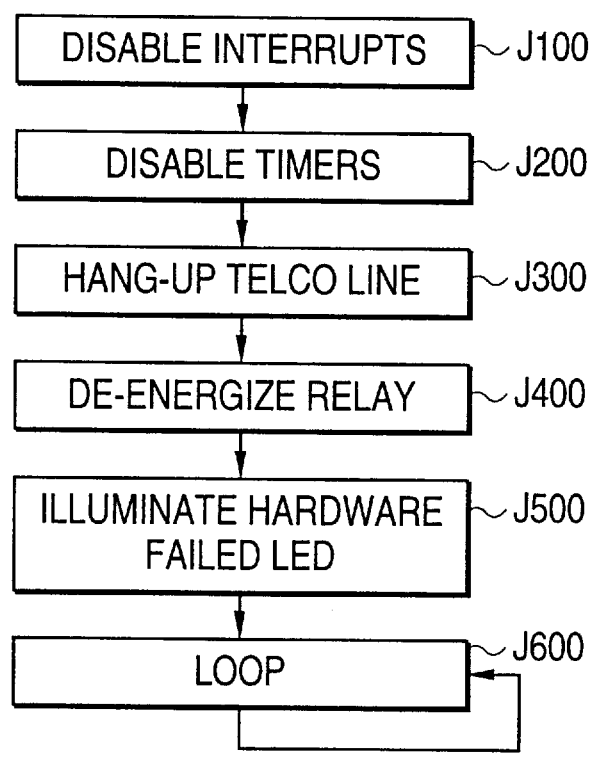
FIG. 13 is a flow diagram of a method for terminating operation used by the invention.

Referring to FIG. 6a, the terminate state B600 is entered when an error has occurred that does not allow the software to perform any further functions. The routine calling the Terminate state will signal the reason for termination. The reason for termination may be used for diagnostic purposes. As shown in FIG. 13, upon entering the terminate state B600 the software will disable interrupts at step J100, disable timers at step J200, hang-up the telephone line if it is off-hook at step J300, and de-energize a relay that couples the facsimile jack into the phone line at step J400. As described in the related application entitled "FACSIMILE JACK FOR SELECTIVELY ROUTING A TRANSMISSION THROUGH A FACSIMILE NETWORK," de-energizing the relay will enable the attached fax device to function as if the facsimile jack were not installed. The software will then illuminate the appropriate diagnostic LED indicating there is a hardware error at step J500. Finally, the software executes a jump loop J600 which performs no other operations.

FIGS. 9b, 10, and 11 show states E300, F550, and G400, respectively, for monitoring a fax session. Other portions of the instant specification also discuss monitoring an incoming or outgoing fax session for the purpose of obtaining statistical data. One embodiment of this process is disclosed herein. The statistical data that can be obtained from a fax conversation itself includes, for example, the number of pages transmitted or received. Additional data on the number of calls, type, and duration can also be gathered but are not dependent on the data within the fax conversation. According to the invention, statistics can be gathered for network and non-network sessions.

As described in the related application entitled "FACSIMILE JACK FOR SELECTIVELY ROUTING A TRANSMISSION THROUGH A FACSIMILE NETWORK," the facsimile jack modem hardware may contain an analog switch to allow the facsimile jack to monitor either the receive signal from the DAA (incoming data) or transmit signal to the DAA (outgoing data) through the receive line of the modem. The analog switch allows the software to control which line the modem is monitoring so that it can look for the appropriate commands to determine if a page is sent or received successfully.

Figure 14:
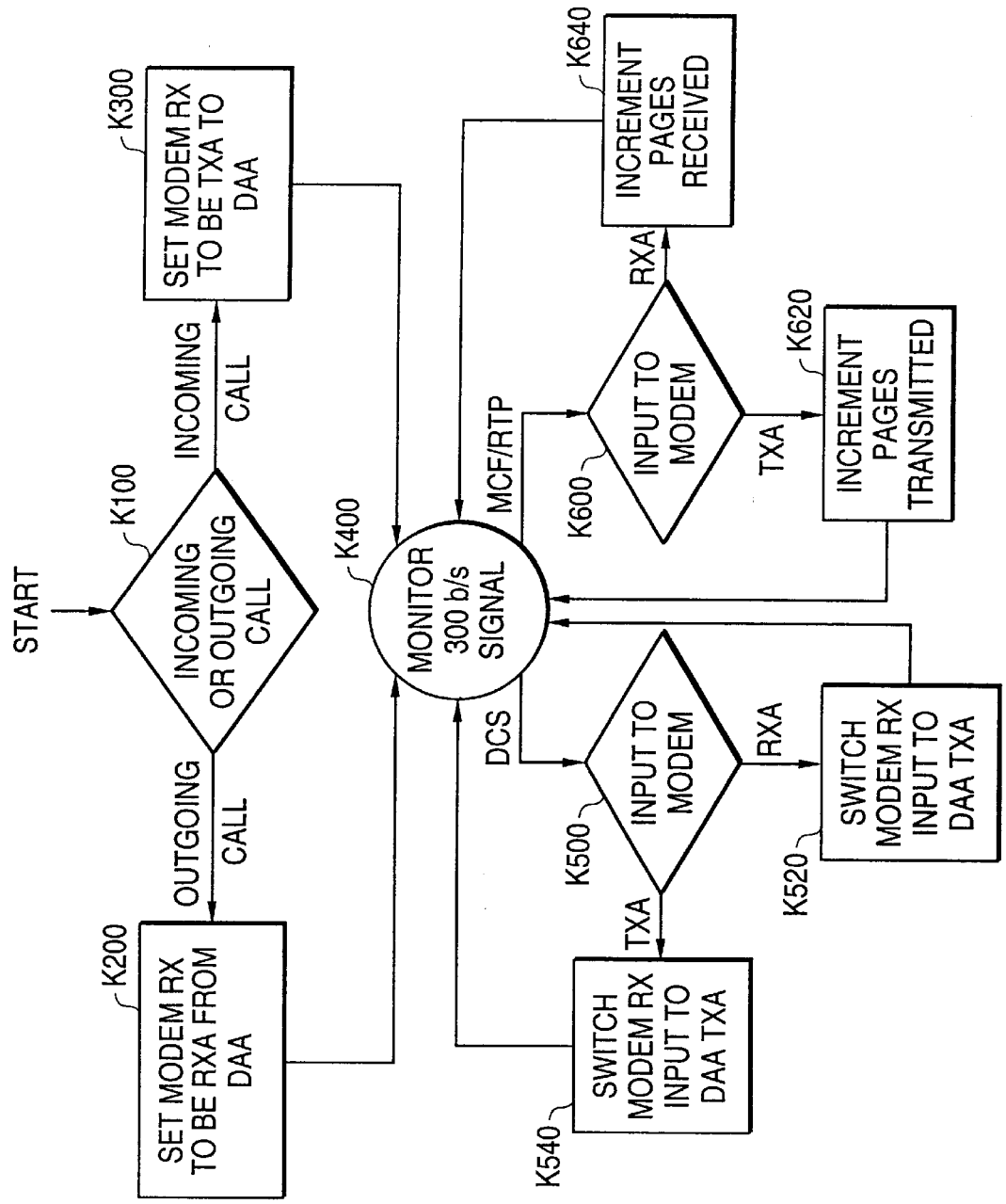
FIG. 14 is a flow diagram of a method for monitoring data transmissions used by the invention.

FIG. 14 is a flowchart of an embodiment according to the invention used to monitor the fax data transmission and determine if a page was sent or received successfully. Monitoring starts when the local fax device is connected to the remote fax device. It applies to either incoming or outgoing fax transmissions. The incoming or outgoing indication only applies to the initial state. The actual direction of the fax transfer is adjusted for based on the data within the messages.

Once the facsimile jack connects the local fax device to a remote fax device, the software determines what half of the communications channel the software needs to monitor in decision step K100. If the call originated from the local fax device the software sets the modem receive to monitor the analog receive, RXA, from the DAA in processing step K200. If the call originated from the remote fax device, the software sets the modem receive to monitor the analog transmit, TXA, into the DAA in processing step K300.

Step K400 monitors the transmission, looking for a data signal from the remote fax device. The data signal may be any one of a Digital Command Signal (DCS), a Message-ConFirmation (MCF) signal, and a ReTrain Positive (RTP) signal as defined by the Telecommunication Standardization Sector of the International Telecommunication Union (ITU-T) Recommendation T.30. A DCS signal instructs the fax device that the direction of transfer for a fax document is changing. Upon detection of DCS, the software switches the input of the modem in steps K500 and K520 or K540 returns to step K400 to monitor for the same signals. Upon detection of a MCF or RTP signal, the software increments the variables that store the number of pages received or transmitted. Note that separate variables can be kept for network and non-network pages sent.

The transmission will continue to be monitored until an on-hook indication is received by the attached fax device. Typically, the transmission is HDLC encoded and will be decoded prior to being used.

When the facsimile jack initially communicates with the SmartPOP™, it may be desirable for the SmartPOP™ to determine if the facsimile jack is registered to use the network. For the purpose of network security, this may be done using an encrypted key. If the facsimile jack is not a valid user of the network, the SmartPOP™ may lockout the facsimile jack from using the network.

Additional security may be incorporated at the SmartPOP™ by detecting the number which the facsimile jack dials from. This prevents the facsimile jack from being stolen and moved to another location.

The user will have the ability to bypass the facsimile jack and make calls as if the facsimile jack were not connected. This can be done in one of the following exemplary ways:

1) Hardware switch—an enable/disable hardware switch on the facsimile jack device. When in the disable position, all calls will be made as if the device were not connected.
2) Special key sequence—a special key sequence which can be issued to the facsimile jack via the fax device or a connected handset.
3) Disconnect power to the FJ—remove power to the device. The design of the facsimile jack device is such the in the unpowered state it allows normal operation of the attached fax device.
4) Disconnect the FJ entirely—removal of the facsimile jack from the telephone line.

The software maintains a table, referred to as the network directory, of those area codes and corresponding exchanges that are serviced by the digital facsimile network within the continental United States. The directory can be stored in NVM and can be updated periodically as the number of area codes and exchanges serviced by the network change. To decrease the amount of data that must be communicated to the facsimile jack at any one time, incremental updates to the directory may be done. Preferably, each area code and the overall directory has an associated checksum to facilitate integrity checking.

A Table Database in the SmartPOP™ contains all versions of the network directory table stored within the facsimile jacks. The existing voice network is used as a final route for traffic that cannot be carried on the digital network. The routing decision could be made within the SmartPOP™, but this would incur an associated LEC charge for all off-net traffic. In order to eliminate LEC charges for off-net traffic, the facsimile jack makes the routing decision instead of the SmartPOP™, by virtue of the network directory table stored at the facsimile jack and periodically updated via the SmartPOP™s.

The routing decision in a facsimile jack is based on information in the network directory table. This information corresponds to the NPA/exchange and a filter. For each dialed number, a bit in the filter is tested. If the bit is set, then the call is on-net and the SmartPOP™ is dialed. Otherwise, the call is placed through the subscriber's existing carrier. The filter includes: a) a bit vector having bits which correspond to international country codes, and b) a bit vector for each national significant number, having bits which correspond to local exchange number or city codes within that NSN (in the U.S., the NSN bit vectors correspond to NPAs (area codes) and are about 800 bits long).

The facsimile jack is nation-centric in format (NSN schemes vary by country) and filter setting (on-net settings vary by country).

The country codes portion of the table only provides filtering by country code. If there is a further filtering of international codes that depends on the locality within the target nation, it does not occur within the facsimile jack. The NSN portion of the table provides filtering by locality within the NSN. In the U.S., any particular exchange within an NPA can be filtered.

A customized local exchange filter can force potentially on-net traffic when the LEC charges exceed a budgeted amount. The effectiveness of this method relies on the correlation of exchange numbers with the variability of LEC charges. If this correlation is low, cost averages of on-net traffic within the exchange must be used to set the filter.

For the facsimile jacks within a single country, one collection of tables can be generated to match the current status of network coverage and LEC charge variations. Both of these parameters (coverage and LEC charges) will vary with time, and require new tables to be downloaded to the facsimile jack by the SmartPOP™s in their respective localities. Each new release of tables is sent to the SmartPOP™s, which in turn update the facsimile jack. The tables are stored in the User Database within the Resource Manager of each of the SmartPOP™s.

A segment of the network directory table is either the country code portion or any one of the NSN portions. The facsimile jack may receive updates in units of segments. One segment may be transferred during the initial few seconds of an on-net all. Since the update of the facsimile jack tables is driven by a user's on-net traffic behavior, it is possible for a user to have a facsimile jack that is more than one release out of date.

In the preferred embodiment, the facsimile jack is provided with updates in a way that allows the updates of the latest release to be downloaded to the facsimile jack, regardless of how many releases out of date its table is. At the same time the exact revision information for each table is maintained in order to track updates. In one arrangement, the SmartPOP™s maintain, in real time, version records for each segment of each user's facsimile jack. This multiplies the size of the user database in the SmartPOP™ by a factor roughly equal to the quantity of table segments.

An alternative approach is possible, where complete knowledge of exact facsimile jack table version content is reduced while still knowing exactly which segments need updating. This alternative approach which is used in the preferred embodiment relies on four components: a) SmartPOP™ user database fields: a table version number and a bit-per-segment bit vector, b) a table version SmartPOP™ database, c) a table update segment SmartPOP™ database, and d) table checksum, calculated by the facsimile jack and reported at the beginning of every on-net call.

The table version number and bit vector in the user record indicates which table version is currently loaded into the facsimile jack and which segments of the table are out of date. When the bit vector is all zeros, the user's table is a completely up to date copy of the table version indicated in the version number field of the user's record.

The table version database and update segment database are both consulted on every on-net call. The result of these interactions updates the version and bit vector fields of the user's record and supplies the next update segment for a call.

When the facsimile jack calls a SmartPOP™, it announces its current table checksum and other identifying information. The SmartPOP™ looks up the user's record and obtains the table version and update vector. Then all three items are presented to the table version database. The table database performs the following actions. First, it compares the reported version/checksum information to the most currently configured tables for the SmartPOP™. If the facsimile jack's table version and checksum match, and the update vector is all zeros, no other action is taken. Second, if the user's version is out of date, it is overwritten with the latest version number. Then the bit vector is adjusted to reflect those segments that have changed between the previous and current table versions. The checksum is ignored. Third, if the version matches but the checksum does not, the result depends on the update vector. If the vector is not all zeros, then the table is in an intermediate state and no further action is taken. If the bit vector is all zeros, then the table in the facsimile jack has a checksum error and must be completely reloaded. The bit vector will then be set to all ones.

After the interaction with the version database, the table update database is consulted to get the next update segment to deliver to the facsimile jack. One of the following two outcomes is possible. In the first outcome, the bit vector is all zeros. No update segment is returned. In the second outcome, the bit vector has one or more bits set. The update database provides an update segment and indicates the segment's corresponding bit in the bit vector. If the segment is successfully delivered to the facsimile jack, the SmartPOP™ will reset the corresponding bit.

The priority order of delivery of update segments can be defined in any way desired within the update database. The facsimile jack may maintain a version number, however, recovering from a version mismatch will in general require a complete download of the table.

The network directory is maintained in NVM according to a data structure. For each area code in service, the data structure contains a Directory NPA block. The Directory NPA Block is basically a table with a one-to-one index of NXX numbers. This table can be structured, for example, as a string of 800 bits, with the first bit (bit 0) representing telephone number 200, and the last bit (bit 799) representing 999. The following C++ language data structure is an exemplary definition of a Directory NPA Block:

```
#define cMinNXX 200
#define cMaxNXX 999
typedef tU8 tDirectoryNPABlock [(cMaxNXXcMinNXX+8)/8);
```

Accessing a particular NXX requires only a simple bit-lookup function as exemplified by the following C++ code:

DNPAB[NXX−cMinNXX]/8&(0x01<<((NXX−cMinNXX)%8))

The directory block may be wrapped in a data structure containing a trailing checksum in C++, for example.

```
struct sDirectoryNPABlock {
    tDirectoryNPABlock DirectoryNPABlock;
    tChecksum Checksum;
};
```

A version number may be used to determine whether the data in this block is stale, and the checksum may be used to assure integrity of the data during download, movement, and copying.

An exemplary update scheme allows complete or partial updates of each block with 16 bits of overhead. For example, an update block may have the following C++ definition:

```
struct sDirectoryNPABlockUpdate_ {
    tU16      NPA;
    struct sUpdateAddress {
        ByteOffset  : 7;
        ByteLength  : 7;
        Reserved    : 2;
    }
    tU8 Data [ ];
};
```

The NPA data member is the NPA coded as a decimal number. The ByteOffset member contains the byte offset into the block at which the update should begin. The ByteLength member contains the number of words to replace from the ByteOffset forward. A block of ByteLength bytes follows. This structure can be wrapped with a checksum similar to that which wraps the DirectoryNPABlock. In C++, for example:

```
struct sDirectory NPABlockUpdate {
    tDirectoryNPABlockupdate DirectoryNPABlockUpdate;
    tChecksum Checksum;
};
```

The above structures allows either incremental or complete updates of each block. For example, complete update can be done by setting the ByteOffset to 0, the ByteLength to (cMaxNXX−cMinNXX+1)/8, and supplying the entire new block as data.

Two exemplary data structures may be used for associating NPA numbers with DirectoryNPABlocks in memory. The first is based on a hash, and is preferable for dense tables. The second is based on a binary table, and is preferable for sparse tables. The hash-based, dense format has the following definition in C++, for example:

```
#define cMinNPA 200 // Nominal
#define cMaxNPA 999 // Nominal
struct sDNBAddress {
    Offset      : 10;
    Reserved    : 6;
};
typedef sDNBAddress tDirectoryNPA [cMaxNPA cMinNPA+1];
```

The reserved bits may be used for flags, for example, a flag to indicate whether the area code is used or a flag to indicate whether it is completely covered. The actual location of the block can be computed in C++, for example, as follows:

Address=DNPA[NPA−cMinNPA].Offset*(cMaxNXX cMinNXX+ 1);

The table-based, sparse format can have the following exemplary C++ definition:

```
#define cMinNPA 200 // Nominal
#define cMaxNPA 999 // Nominal
struct sDNBAddress {
    Offset      : 10;
    Reserved    : 6;
};
struct sDNBAddressLookup {
    tU16 NPA;
    sDNBAddress Address;
};
struct tDirectoryNPATable {
    Format : 1; // O=binary, 1=unsorted.
    tU16 MinNPA
    tU16 MaxNPA
    sDNBAddressLookup Table [MaxNPA−MinNPA+1];
};
```

Lookup of a block address may be done by either a binary sort or an unsorted lookup in the table, depending on the value of Format. The address is calculated from the offset stored in sDNBAddressLookup.Address. Note that some of the foregoing exemplary data structures violate C++ rules and are offered only to illustrate a preferred structure.

A SmartPOP™ updates the network directory by sending the proper communications message, which contains an update block. If the update is for an NPA which is already in use, the software writes the updated data over the old data and computes a new checksum for the block. If the update is for an NPA which is not yet used, the software allocates a new NPA block, assigns an address table pointer to the block, writes the update data into the block, and computes the new checksum. If the update is not a complete block, all un-updated positions in the new block are initialized to a "not serviced" value, preferably a bit value of zero.

Communications between the facsimile jack and the SmartPOP™ is typically done through the use of a modem. For every 8 bits of data that are communicated, 10 bits of data are transferred. The 2 extra bits are for the start and stop bits required for the protocol.

Three exemplary methods to update the network directory are as follows:
1) Front-end transfer—at the beginning of a fax transmission that goes through the SmartPOP™. When the software initially communicates to the SmartPOP™, it transfers call setup information. After the call setup data is transferred, the SmartPOP™ can issue commands to the software indicating that it is going to download a new version of the network directory. This front-end-transfer of data is preferably limited to 1 or possibly 2 area code updates as there is a limited amount of time the attached device will stay connected before deciding the attempt to connect to the destination fax device was unsuccessful.

2) User initiated call back—the user can enter a special DTMF sequence that will instruct the software to call back to the SmartPOP™ and request the latest network directory. The DTMF sequence can contain the number to call. This option facilitates customer support and provides a method for forcing an update of the network directory in the event that a customer requests an immediate update or if the network directory gets corrupted.

3) SmartPOP™ initiated call back—When the software calls the SmartPOP™, the SmartPOP™ can instruct it to call back at a later time for further communications. These communications can include a download of part or all of the network directory. The FJ calls the SmartPOP™ back at a specified time to request a download of network directory or other information.

It is generally preferable to have directory updates done on an incremental basis.

To facilitate directory updating and validation, each area code can have a separate checksum. Each area code that changes can then become an incremental update. This minimizes the amount of updating that needs to take place in the event that NVM becomes corrupted. Only those area codes that do not have valid checksums will need to be downloaded.

NVM may include two separate components, NVM code and NVM data. Even though these components may be stored in the same physical device, the mechanism to access each will typically be different. For example, the NVM code segment is where software control code which can be updated through the use of the modem will be stored. To facilitate access to the NVM code segment for execution, a jump table can be stored at the beginning of the segment. This provides entry points that are accessible from the ROM code segment. The jump table is part of the NVM code segment and can be included in the NVM code selftest. A mechanism is provided for transfer and return of execution from the NVM code segment. Several of the entry points into the NVM code segment can be predefined to allow for expanded selftest and control code.

The NVM data segment is used to store persistent data for the facsimile jack. The data structures that will be stored in NVM data may utilize a paged memory access scheme depending on the amount of storage required. NVM will be used to store the network directory as well as statistical and setup data. The network directory, for example, includes 800 exchanges for each area code used. Currently in the United States, there are approximately 180 area codes in use. However, area codes are structured such that there could be up to 800 area codes in use. Therefore, there could be 800 area codes, each with 800 exchanges. If, for example, one bit is allocated for each exchange within an area code to designate whether it is serviced or not, 640,000 bits or 80,000 bytes may be required to store the network directory. This assumes that there is no data compression used. Compression of the network directory should be balanced against efficient storage and the ability to quickly uncompress the directory and determine if a number being dialed by a connected fax device is serviced by the network.

In addition to holding the network directory, NVM may store a mapping of the country codes that are serviced by the network as well as statistical data, SmartPOP™ local calling number, PBX prefix information, checksums, and other information. For example, customer site setup data may be stored in NVM. Customer site setup data may include the following:

1. Serial Number—FJ serial number.
2. Encrypted Key Sequence—key used to gain access to the network. This number may be obtained during registration.
3. Local Area Code—local area code where the facsimile jack resides.
4. Local Exchange—local exchange where the facsimile jack resides.
5. Local Exchange—PBX prefix code, if any, required for local calls.
6. Long Distance PBX Prefix—PBX prefix code, if any, required for long distance calls.
7. Dialing Suffix Length—Length of dialing suffix.
8. Gather Statistical Data Prior to Registration—indicates that the software should gather statistical data even if it is not registered.

The NVM may also store Network Service Setup Data used to access the network. This data can be downloaded to the facsimile jack during initial setup. Network service setup data may include the following:

1. Domestic alternate service—indicates if the facsimile jack should use an alternate service for domestic long distance calls in the event that either the SmartPOP™ was busy, SmartPOP™ did not answer or the area code and exchange are not in the network directory.
2. Domestic alternate service number—alternate service phone number, including area code if required, used to dial domestic long distance calls.
3. Domestic alternate service local/long distance designation—indicates if the domestic alternate service number is local or long distance.
4. International alternate service—indicates if the facsimile jack should use an alternate service for international calls in the event that either the SmartPOP™ was busy, SmartPOP™ did not answer or the area code and exchange are not in the network directory.
5. International alternate service number—international alternate service number, including area code if required, used to dial international calls.
6. International alternate service number local/long distance designation—indicates if the international alternate service number is local or long distance.
7. SmartPOP™ phone number—phone number, including area code if required, to dial SmartPOP™. Does not include PBX code.
8. SmartPOP™ phone number local/long distance designation—indicates if the SmartPOP™ phone number is local or long distance.
9. SmartPOP™ time-out—time to wait before determining that SmartPOP™ is not going to answer.
10. Alternate service time-out—time to wait before determining that alternate service is not going to answer.
11. SmartPOP™ encryption sequence—an encrypted key sequence used for gaining access to the network.
12. Alternate service encryption sequence—an encryption the sequence used for gaining access to the alternate service.
13. Selective SmartPOP™ usage time-out—amount of time in minutes that selective SmartPOP™ usage is in effect from when originally requested.
14. End of number delay—amount of time in tenths of seconds to wait between digits to determine the end of a telephone number.

15. FJ time-out—amount of time to wait before determining that the connected fax device did not place the line back on-hook.
16. SmartPOP™ retry count—number of times to call SmartPOP™ back when busy or does not answer before utilizing alternate service or customers long distance carrier.
17. Alternate service retry count—number of times to retry alternate service when busy or does not answer before proceeding to customer's long distance carrier.

The NVM also holds an international directory which contains the country codes serviced by the digital facsimile network. Countries not serviced by the network can be routed through the users default long distance carrier. All calls to serviced countries can be routed through the network. The software typically does not check to insure that the particular exchange is serviced by a SmartPOP™ in the country being dialed (as long as the country is serviced). There are two reasons this approach may be preferred. The first is that the area codes and exchanges for the countries require extra storage. The second reason is that even if a particular exchange of a country is not serviced directly by a SmartPOP™ in that exchange, it will still be less expensive to complete the call via a long distance call from a SmartPOP™ in the country than to make a direct international call.

The international directory may, for example, be defined by a data structure of 1000 bits (125 bytes) with each bit corresponding to a country code. The bit can be set to "1" to indicate a country is serviced and to "0" to indicate a country is not serviced. The structure may also include a checksum located, for example, as the last 3 bytes of the data structure.

The NVM can also hold Statistical Data segment contains data collected from incoming and outgoing fax sessions. The data structure may include a checksum located, for example, as the last 3 bytes of the data structure. The data in the statistical data segment can be transmitted to the SmartPOP™ upon request. The SmartPOP™ has the capability to request an upload of all or parts of the statistical data. All data values are maintained until a clear command is received from the SmartPOP™. The SmartPOP™ has the capability to request clearing all or parts of the statistical data.

Statistical data values can be, for example, 16 bits and typically are cumulative unless otherwise specified. If a value reaches its maximum value it can be maintained at that maximum value until cleared by a command from the SmartPOP™. Statistical data values which reach their maximum value are typically handled by ceasing accumulation of that data and any additional data associated with that value. For example, if a counter corresponding to a total number of transmissions reaches its maximum value, neither the counter nor data corresponding to a total time of transmissions will be incremented when additional transmissions are made.

Data corresponding to various times are typically maintained as a multiple of a base time. The base time is initialized to a default and can be modified either at during registration or immediately after statistics have been cleared. Statistical data maintained by the software includes the following:

1. Total fax time—total time for successful fax transmissions. This includes calls made through the network and calls not made through the network. The time can be measured, for example, from when the software turns control over to the attached fax device until it detects an on-hook request from the fax device.
2. Total calls—total number of successful and unsuccessful calls made by the FJ. It includes both calls made through the network and calls not made through the network.
3. SmartPOP™ domestic long distance calls answered—number of domestic long distance calls that went through the SmartPOP™. This number is incremented each time the FJ calls the SmartPOP™ with a domestic long distance request and the SmartPOP™ instructs the FJ to connect the attached fax device to the SmartPOP™.
4. SmartPOP™ domestic long distance time—time for domestic long distance calls that went through the SmartPOP™. The time can be measured, for example, from when the facsimile jack is instructed to connect the attached fax device to the SmartPOP™ until it detects an on-hook request from the fax device.
5. SmartPOP™ domestic long distance calls busy—number of domestic long distance calls that were attempted to the SmartPOP™ but received a busy signal. This number is incremented each time the facsimile jack calls the SmartPOP™ with a request for a domestic long distance call and it is determined that the SmartPOP™ returned a busy signal.
6. SmartPOP™ domestic long distance calls not answered—number of domestic long distance calls that tried to go through the SmartPOP™ but the SmartPOP™ did not answer. This number is incremented each time the facsimile jack calls the SmartPOP™ with a request for a domestic long distance call and determines that the SmartPOP™ did not answer. It does not include calls placed to the SmartPOP™ that returned a busy signal.
7. SmartPOP™ international calls answered—number of international calls that went through the SmartPOP™. This number is incremented each time an international call is placed through the SmartPOP™ and the SmartPOP™ instructs the software to connect the attached fax device to the SmartPOP™.
8. SmartPOP™ international calls time—time for international calls that went through the SmartPOP™.
9. SmartPOP™ international calls busy—number of international calls that tried to go through the SmartPOP™ but received a busy signal.
10. SmartPOP™ international calls not answered—number of international calls that tried to go through the SmartPOP™ but the SmartPOP™ did not answer.
11. Alternate calls answered—number of successful calls made to the alternate number. This number is incremented each time the facsimile jack calls the alternate network service number with a domestic long distance request and the alternate service instructs the software to connect the attached fax device to the alternate service.
12. Alternate calls time—time for calls placed through the alternate number. The time can be measured, for example, from when the software is instructed to connect the attached fax device to the alternate service until it detects an on-hook request from the fax device.
13. Alternate calls busy—number of calls attempted to the alternate number but the alternate number was busy. This number is incremented each time the facsimile jack calls the alternate network service number with a domestic long distance request and the alternate service is busy.
14. Alternate calls not answered—number of calls attempted to the alternate number but the alternate number did not answer. This number is incremented each time the facsimile jack calls the alternate network service number with a domestic long distance request and the alternate service does not answer.

15. Non-SmartPOP™ domestic long distance calls answered—number of calls that did not go through the SmartPOP™ or the alternate service but were successfully connected.

16. Non-SmartPOP™ domestic long distance calls time—time for calls not placed through the SmartPOP™ or alternate service. The time is measured from when the software connects the fax device to the outgoing line until it detects an on-hook request from the fax device.

17. Non-SmartPOP™ domestic long distance calls busy—number of calls that did not go through the SmartPOP™ or the alternate service that were busy. This number is incremented each time the FJ dials a long distance number that does not go through the SmartPOP™ or alternate service and detects a busy signal.

18. Non-SmartPOP™ domestic long distance calls not answered—number of calls that did not go through the SmartPOP™ or the alternate service that were not answered. This number is incremented each time the software dials a long distance number that does not go through the SmartPOP™ or alternate service and does not receive an answer.

19. Local calls answered—number of local calls that were successfully completed. This number is incremented each time the software connects the attached fax device to a connection made to a local telephone number.

20. Local calls time—time for calls placed locally. The time is measured from when the software connects the attached fax device to the dialed local fax device until on-hook condition is detected from the attached fax device.

21. Local calls busy—number of local calls placed that were busy. This number is incremented when the software dials a local number and detects a busy signal.

22. Local calls not answered—number of local calls that were not answered. This number is incremented when the software dials a local number and does not receive an answer.

23. Incoming calls—number of incoming fax calls. This number is incremented when an incoming call is connected to the attached fax device.

24. Incoming calls time—time for incoming calls. This time can be measured, for example, from when an incoming call is connected to the attached fax device until an on-hook condition is detected.

25. SmartPOP™ calls bypassed—number of calls that could have gone through the SmartPOP™ that were bypassed by the customer. This number is incremented each time a fax call is made that could have gone through the network but did not because the facsimile jack was in bypass mode. This includes both domestic and international calls.

26. SmartPOP™ calls bypassed time—time for calls that could have gone through SmartPOP™ but were bypassed. This time is measured from the time that the software connects the attached fax device to dialed fax device until it detects an on-hook condition.

27. Outdoing call distribution table—table of total fax calls placed on an hourly basis.

This table may contain, for example, 24–16 bit counters corresponding to each hour of the day that total the number of outgoing fax calls on an hourly basis. It should be noted that the software may not know what the current time is until it has communicated with the SmartPOP™. To maintain an accurate call distribution table, the software may also maintain a relative table with 24–16 bit counters in which data is accumulated on a relative basis until the actual time is known.

When the actual time is received from the SmartPOP™, the relative data can be merged in with the actual outgoing call distribution table.

28. Incoming call distribution table—table of total incoming fax calls on an hourly basis. This table is the companion to the outgoing call distribution table and may be structured in a similar manner.

The software can indicate basic diagnostic information to the user, for example, through the use of 2 sets of LEDs. The LEDs can be placed on the facsimile jack and be visible by the user. The first set of diagnostic indicators may consist of 2 LEDs which will be green in color when illuminated. One can be used to indicate that the device has power. The second LED of this set can be illuminated, for example, when a fax transmission is being directed either through the network or alternate service. The second set of diagnostic indicators may consist of 3 red LEDs and will be used to indicate status. The following table shows exemplary status designations:

| Status | LED3 | LED2 | LED1 |
| --- | --- | --- | --- |
| OK | Off | Off | Off |
| Non-Fatal Hardware Error | Off | Off | On |
| NVM Data Segment Error | Off | On | Off |
| Control Code Checksum Error | Off | On | On |
| Reserved | On | Off | Off |
| Local Control Mode | On | Off | On |
| Not Set-Up | On | On | Off |
| Fatal Hardware Error | On | On | On |

The following is a description of each of the exemplary status codes:

OK—indicates the FJ has been setup correctly and is functioning normally.

Non-Fatal Hardware Error—indicates the facsimile has a hardware error but is able to partially operate. The level of functionality depends on the hardware component that failed selftest.

NVM Data Segment Error—indicates that one or more of the NVM data segments has a checksum error and needs to be corrected.

Control Code Checksum Error—indicates that the section of software that is software downloadable has a checksum error and needs to be reprogrammed.

Reserved—indicates LED display sequence that is not currently used.

Local Control Mode—indicates that the software has entered local control mode.

Not Set-Up—indicates that the FJ has not been successfully setup.

Fatal Hardware Error—indicates that a fatal hardware error has been encountered and the facsimile jack is not able to operate.

While the foregoing description refers primarily to communication equipment (i.e. telephones and facsimile devices) employing dual tone multiple frequency (DTMF) technology, one skilled in the art will appreciate that the method disclosed herein is applicable to rotary telephones and other communication equipment utilizing pulse dialing.

While particular embodiments according to the invention have been illustrated and described above, it will be clear that the invention can take a variety of forms and embodiments within the scope of the appended claims.

What is claimed is:

1. A method of routing a data transmission comprising the steps of:
   (a) receiving a destination number of said data transmission corresponding to a destination device directly reachable on a first communication network, said destination number not directly corresponding to a number on a second communication network;
   (b) determining whether said data transmission should be routed through said second communication network and not through said first communication network; and
   (c) routing said data transmission through said second communication network if step (b) determines said data transmission should be routed through said second communication network, wherein said data transmission is routed through said second communication network even though said data transmission is capable of being routed through said first communication network.

2. The method of claim 1, wherein step (a) comprises the steps of:
   (a1) isolating a device which produced said data transmission from said first communication network; and
   (a2) intercepting said destination number of said data transmission when said device attempts to connect to said first communication network.

3. The method of claim 1, wherein the determination in step (b) is made in accordance with locally held information.

4. The method of claim 3, wherein the locally held information comprises communication network exchange information.

5. The method of claim 3, wherein the locally held information comprises selective access information.

6. The method of claim 1, wherein said data transmission is one of a facsimile data transmission, a voice data transmission, and a modem data transmission.

7. The method of claim 1, wherein the destination number is not capable of being directly routable through the second communication network to a destination device, but is converted to a number that is capable of being routed through the second communication network when step b) determines that said data transmission should be routed through said second communication network.

8. The method of claim 7, wherein the data transmission is routed from a source device to a first device connected to the second communication network using the converted number, and wherein the destination number is included in a data packet transmitted to a second device that is also connected to the second communication network, and
   wherein the second device uses the destination number to connect with the destination device to complete the data transmission.

9. The method of claim 8, wherein the destination device is not directly reachable on the second communication network.

10. A method of routing a fax transmission comprising the steps of:
    (a) receiving a destination number of said data transmission corresponding to a destination device directly reachable on a first communication networks, said destination number not directly corresponding to a destination on said second communication network;
    (b) determining whether said data transmission should be routed through a second communication network and not through said first communication network; and
    (c) routing said data transmission through said second communication network if step (b) determines said data transmission should be routed through said second communication network, wherein said data transmission is routed through said second communication network even though said data transmission is capable of being routed from said first communication network.

11. The method of claim 10, wherein step (a) comprises the steps of:
    (a1) isolating a device which produced said facsimile transmission from said first communication network; and
    (a2) intercepting said destination number of said facsimile transmission when said device attempts to connect to said first communication network.

12. The method of claim 10, wherein the determination in step (b) is made in accordance with locally held information.

13. The method of claim 12, wherein the locally held information comprises communication network exchange information.

14. The method of claim 12, wherein the locally held information comprises selective access information.

15. A method of routing a facsimile transmission comprising the steps of:
    (a) detecting an off-hook signal from a facsimile device;
    (b) pre-dialing a plurality of digits of a telephone number corresponding to a pre-determined communication network, the plurality of digits corresponding to a portion of said telephone number;
    (c) determining whether a connection to the pre-determined communication network should be established; and
    (d) dialing a remainder of digits of said telephone number of said predetermined communication network if step (c) determines that said connection should be established.

16. The method of claim 15, wherein step (a) further comprises:
    (1) connecting a receive portion of a telephone line to a receive portion of said facsimile device, whereby said facsimile device detects a dial tone; and
    (2) isolating a transmit portion of said telephone line from a transmit portion of said facsimile device.

17. The method of claim 15, wherein step (c) is coincident with step (b).

18. A method of routing a facsimile transmitted from a facsimile device comprising the steps of:
    (a) determining whether said facsimile device has been taken off-hook, and if said facsimile device has been taken off hook,
       (1) pre-dialing a telephone number of a pre-determined communication network;
       (2) parsing a destination number received from said facsimile device;
       (3) determining whether said destination number contains a local control command, and if said destination number contains said local control command,
          (i) processing said local control command; and
          (ii) returning to step (a);
       (4) processing said destination number to route a transmission of said facsimile device;
       (5) monitoring said transmission;
       (6) updating a statistical database with information corresponding to said transmission; and
       (7) returning to step (a);
    (b) determining whether a ring signal is present on a telephone line coupled to said facsimile device, and if said ring signal is present, (1) connecting said facsimile device to said telephone line;
(2) monitoring an incoming facsimile transmission; and
(3) updating the statistical database with information corresponding to said incoming facsimile transmission; and
(4) returning to step (a);

(c) determining whether a callback should be processed, and if said callback should be processed:
(1) processing said callback; and
(2) returning to step (a);
and
(d) returning to step (a).

19. The method of claim 18, wherein step (a)(4) comprises:
(i) receiving a destination telephone number corresponding to a first communication network;
(ii) determining whether said destination number is excluded from being routed through a second communication network, and if said destination number is not excluded:
(A) determining if said facsimile transmission should be routed through said second communication network, and if said facsimile transmission should be routed through said second communication network:
(1) routing said facsimile transmission through said second communication network; and
(2) skipping steps (iii) and (iv);
(iii) determining whether said facsimile transmission should be routed through an alternate service network, and if said facsimile transmission should be routed through said alternate service network,
(A) routing said facsimile transmission through said alternate service network; and
(B) skipping step (iv);
(iv) routing said facsimile transmission through said first communication network.

20. The method of claim 15, further comprising the step of, if step c) determines that said connection should not be established to the pre-determined communication network, dialing the remainder of digits of said telephone number of said predetermined communication network and routing the facsimile transmission through a telephone network different from the predetermined communication network.

* * * * *